United States Patent
Todd et al.

(10) Patent No.: US 9,023,770 B2
(45) Date of Patent: May 5, 2015

(54) INCREASING FRACTURE COMPLEXITY IN ULTRA-LOW PERMEABLE SUBTERRANEAN FORMATION USING DEGRADABLE PARTICULATE

(75) Inventors: Bradley L. Todd, Duncan, OK (US); Thomas D. Welton, Duncan, OK (US)

(73) Assignee: Halliburton Energy Services, Inc., Houston, TX (US)

( * ) Notice: Subject to any disclaimer, the term of this patent is extended or adjusted under 35 U.S.C. 154(b) by 10 days.

(21) Appl. No.: 13/017,745

(22) Filed: Jan. 31, 2011

(65) Prior Publication Data

US 2011/0120712 A1 May 26, 2011

Related U.S. Application Data

(63) Continuation-in-part of application No. 12/512,232, filed on Jul. 30, 2009, now abandoned, and a continuation-in-part of application No. 12/957,522, filed on Dec. 1, 2010, now Pat. No. 8,657,003.

(51) Int. Cl.
*C09K 8/528* (2006.01)
*C09K 8/68* (2006.01)
(Continued)

(52) U.S. Cl.
CPC . *C09K 8/03* (2013.01); *C04B 28/02* (2013.01); *C04B 2103/0045* (2013.01); *C09K 8/42* (2013.01); *C09K 8/467* (2013.01); *C09K 8/516* (2013.01); *C09K 8/536* (2013.01); *C09K 8/685* (2013.01); *E21B 43/267* (2013.01); *C09K 2208/18* (2013.01); *Y10S 507/922* (2013.01); *Y10S 507/924* (2013.01)

(58) Field of Classification Search
CPC .. C09K 8/80; C09K 2208/18; Y10S 507/922; Y10S 507/924
USPC ........................ 507/203, 237, 241; 166/308.1
See application file for complete search history.

(56) References Cited

U.S. PATENT DOCUMENTS

| | | | |
|---|---|---|---|
| 2,410,219 A | | 10/1946 | Langstroth |
| 4,051,900 A | * | 10/1977 | Hankins ..................... 166/280.2 |

(Continued)

OTHER PUBLICATIONS

International Search Report and Written Opinion for PCT/GB2012000097 dated Apr. 23, 2012.
(Continued)

*Primary Examiner* — Aiqun Li
(74) *Attorney, Agent, or Firm* — Holly Soehnge; Baker Botts L.L.P.

(57) ABSTRACT

A method of increasing the fracture complexity in a treatment zone of a subterranean formation is provided. The subterranean formation is characterized by having a matrix permeability less than 1.0 microDarcy. The method includes the step of pumping one or more fracturing fluids into a far-field region of a treatment zone of the subterranean formation at a rate and pressure above the fracture pressure of the treatment zone. A first fracturing fluid of the one or more fracturing fluids includes a first solid particulate, wherein: (a) the first solid particulate includes a particle size distribution for bridging the pore throats of a proppant pack previously formed or to be formed in the treatment zone; and (b) the first solid particulate comprises a degradable material. In an embodiment, the first solid particulate is in an insufficient amount in the first fracturing fluid to increase the packed volume fraction of any region of the proppant pack to greater than 73%. Similar methods using stepwise fracturing fluids and remedial fracturing treatments are provided.

32 Claims, 4 Drawing Sheets

(51) Int. Cl.
- *E21B 43/26* (2006.01)
- *C09K 8/03* (2006.01)
- *C04B 28/02* (2006.01)
- *C09K 8/42* (2006.01)
- *C09K 8/467* (2006.01)
- *C09K 8/516* (2006.01)
- *C09K 8/536* (2006.01)
- *E21B 43/267* (2006.01)
- *C04B 103/00* (2006.01)

(56) References Cited

U.S. PATENT DOCUMENTS

| | | | |
|---|---|---|---|
| 4,527,628 | A | 7/1985 | Dill et al. |
| 6,985,816 | B2 * | 1/2006 | Sorrells et al. ............... 702/14 |
| 7,021,383 | B2 | 4/2006 | Todd et al. |
| 7,044,220 | B2 | 5/2006 | Nguyen |
| 7,237,612 | B2 | 7/2007 | Surjaatmadja et al. |
| 7,413,017 | B2 | 8/2008 | Nguyen et al. |
| 7,686,080 | B2 | 3/2010 | Todd et al. |
| 7,727,935 | B2 | 6/2010 | Welton et al. |
| 7,784,541 | B2 | 8/2010 | Hartman et al. |
| 2004/0074643 | A1 | 4/2004 | Munoz, Jr. et al. |
| 2004/0261993 | A1 | 12/2004 | Nguyen |
| 2004/0261995 | A1 | 12/2004 | Nguyen et al. |
| 2005/0034865 | A1 | 2/2005 | Todd et al. |
| 2005/0045384 | A1 | 3/2005 | Nguyen |
| 2005/0051330 | A1 | 3/2005 | Nguyen |
| 2005/0059557 | A1 | 3/2005 | Todd et al. |
| 2005/0059558 | A1 | 3/2005 | Blauch et al. |
| 2005/0121192 | A1 | 6/2005 | Hailey, Jr. et al. |
| 2005/0126780 | A1 | 6/2005 | Todd et al. |
| 2005/0126785 | A1 | 6/2005 | Todd |
| 2005/0130848 | A1 | 6/2005 | Todd et al. |
| 2005/0155772 | A1 | 7/2005 | Dusterhoft et al. |
| 2005/0161220 | A1 | 7/2005 | Todd et al. |
| 2005/0183741 | A1 | 8/2005 | Surjaatmadja et al. |
| 2005/0205265 | A1 | 9/2005 | Todd et al. |
| 2005/0274522 | A1 | 12/2005 | Surjaatmadja et al. |
| 2006/0048943 | A1 | 3/2006 | Parker et al. |
| 2006/0065397 | A1 | 3/2006 | Nguyen et al. |
| 2006/0090896 | A1 | 5/2006 | Chatterji et al. |
| 2006/0113078 | A1 | 6/2006 | Nguyen et al. |
| 2006/0118301 | A1 | 6/2006 | East, Jr. et al. |
| 2006/0157243 | A1 | 7/2006 | Nguyen |
| 2006/0169182 | A1 | 8/2006 | Todd et al. |
| 2006/0172793 | A1 | 8/2006 | Todd et al. |
| 2006/0185848 | A1 | 8/2006 | Surjaatmadja et al. |
| 2006/0196661 | A1 | 9/2006 | East, Jr. et al. |
| 2006/0205608 | A1 | 9/2006 | Todd |
| 2006/0254774 | A1 | 11/2006 | Saini et al. |
| 2006/0276345 | A1 | 12/2006 | Todd et al. |
| 2006/0283591 | A1 | 12/2006 | Willberg et al. |
| 2006/0289160 | A1 | 12/2006 | van Batenburg et al. |
| 2007/0017706 | A1 | 1/2007 | Nguyen |
| 2007/0029086 | A1 | 2/2007 | East, Jr. |
| 2007/0078064 | A1 | 4/2007 | Munoz, Jr. et al. |
| 2007/0238623 | A1 | 10/2007 | Saini et al. |
| 2007/0277979 | A1 | 12/2007 | Todd et al. |
| 2008/0060809 | A1 | 3/2008 | Parker et al. |
| 2008/0070805 | A1 | 3/2008 | Munoz et al. |
| 2008/0070807 | A1 | 3/2008 | Munoz et al. |
| 2008/0070808 | A1 | 3/2008 | Munoz et al. |
| 2008/0078546 | A1 | 4/2008 | Welton et al. |
| 2008/0093073 | A1 | 4/2008 | Bustos et al. |
| 2008/0139415 | A1 | 4/2008 | Bustos et al. |
| 2008/0190619 | A1 * | 8/2008 | Brannon et al. ............ 166/308.2 |
| 2008/0210422 | A1 | 9/2008 | Clark et al. |
| 2008/0217011 | A1 | 9/2008 | Pauls et al. |
| 2008/0289823 | A1 | 11/2008 | Willberg et al. |
| 2009/0038799 | A1 * | 2/2009 | Garcia-Lopez de Victoria et al. ........................ 166/280.2 |
| 2009/0053509 | A1 | 2/2009 | Lloyd et al. |
| 2009/0062157 | A1 | 3/2009 | Munoz, Jr. et al. |
| 2009/0095535 | A1 | 4/2009 | Nguyen |
| 2009/0107671 | A1 * | 4/2009 | Waters et al. ............... 166/280.1 |
| 2009/0223667 | A1 | 9/2009 | Rispler |
| 2009/0242202 | A1 | 10/2009 | Rispler et al. |
| 2009/0255668 | A1 | 10/2009 | Fleming et al. |
| 2010/0032160 | A1 | 2/2010 | Wilson et al. |
| 2010/0200235 | A1 | 8/2010 | Luo et al. |
| 2010/0230108 | A1 | 9/2010 | Todd et al. |
| 2010/0267591 | A1 | 10/2010 | Todd et al. |
| 2010/0273685 | A1 | 10/2010 | Saini et al. |
| 2011/0005760 | A1 | 1/2011 | Hartman et al. |

OTHER PUBLICATIONS

Tonmukayakul. N. Bryant, J.E. Talbot, M.S. and Morris, J.F., "Dynamic and steady shear properties of reversible cross-linked guar solution and their effects on particle settling behavior", The XVth International Congress on Rheology, Monterey, California, Aug. 3-8, 2008. American Institute of Physic Conference Proceedings 1027 ISBN:978-0-7354-0549-3.

Tonmukayakul. N. Bryant, J.E. and Morris, J.F., "Experimental investigation of the sedimentation behavior of concentrated suspension in non-Newtonian fluids under simple shear flows", $82^{nd}$ Annual Meeting, The Society of Rheology, Santa Fe, New Mexico, Oct. 24-28, 2010. ISBN.

King, George E., "Thirty Years of Gas Shale Fracturing: What Have We Learned", Sep. 19-22, 2010.

Luffel, D.L.; Hopkins, C.W., Schettler Jr., P.D.; "Matrix Permeability Measurement of Gas Productive Shales".

* cited by examiner

INCREASING FRACTURE COMPLEXITY IN ULTRA-LOW PERMEABLE SUBTERRANEAN FORMATION USING DEGRADABLE PARTICULATE

CROSS-REFERENCE TO RELATED APPLICATIONS

This is a continuation-in-part of: (a) co-pending U.S. application Ser. No. 12/512,232, filed Jul. 30, 2009, having for named inventors Thomas D. Welton and Bradley L. Todd, entitled "Methods of Fluid Loss Control and Fluid Diversion in Subterranean Formations," which is incorporated by reference; and (b) co-pending U.S. patent application Ser. No. 12/957,522, filed on Dec. 1, 2010, having for named inventors Thomas D. Welton and Bradley L. Todd, entitled "Methods of Providing Fluid Loss Control or Diversion," which is incorporated by reference.

BACKGROUND

1. Technical Field

The inventions generally relate to the field of producing crude oil or natural gas from a well. More particularly, the inventions are directed to improved methods and well fluids for use in wells.

2. Background Art

Oil & Gas Reservoirs

In the context of production from a well, oil and gas (in this context referring to crude oil and natural gas) are well understood to refer to hydrocarbons naturally occurring in certain subterranean formations. A hydrocarbon is a naturally occurring organic compound comprising hydrogen and carbon. A hydrocarbon molecule can range from being as simple as methane ($CH_4$) to a large, highly complex molecule. Petroleum is a mixture of many different hydrocarbons.

A subterranean formation is a body of rock that has sufficiently distinctive characteristics and is sufficiently continuous for geologists to describe, map, and name it. In the context of formation evaluation, the term refers to the volume of rock seen by a measurement made through a wellbore, as in a log or a well test. These measurements indicate the physical properties of this volume of rock, such as the property of permeability.

A subterranean formation containing oil or gas is sometimes referred to as a reservoir. A reservoir is a subsurface, porous, permeable, or naturally fractured rock body in which oil or gas is stored. Most reservoir rocks are limestones, dolomites, sandstones, or a combination of these. The four basic types of hydrocarbon reservoirs are oil, volatile oil, gas condensate, and dry gas.

An oil reservoir generally contains three fluids—gas, oil, and water—with oil the dominant product. In the typical oil reservoir, these fluids become vertically segregated because of their different densities. Gas, the lightest, occupies the upper part of the reservoir rocks; water, the lower part; and oil, the intermediate section. In addition to its occurrence as a cap or in solution, gas may accumulate independently of the oil; if so, the reservoir is called a gas reservoir. Associated with the gas, in most instances, are salt water and some oil.

Volatile oil reservoirs are exceptional in that during early production they are mostly productive of light oil plus gas, but, as depletion occurs, production can become almost completely gas. Volatile oils are usually good candidates for pressure maintenance, which can result in increased reserves.

In a gas condensate reservoir, the hydrocarbons may exist as a gas, but, when brought to the surface, some of the heavier hydrocarbons condense and become a liquid.

In the typical dry gas reservoir natural gas exists only as a gas and production is only gas plus fresh water that condenses from the flow stream reservoir. The conventional natural gas reservoirs have a matrix permeability in the range of about 500 milliDarcy to about 1 milliDarcy.

A reservoir is in a shape that will trap hydrocarbons and that is covered by a relatively impermeable rock, known as cap rock. The cap rock forms a barrier above reservoir rock so that fluids cannot migrate beyond the reservoir. A cap rock capable of being a barrier to fluid migration on a geological time scale has a permeability that is less than about 1 microDarcy. Cap rock is commonly salt, anhydrite, or shale.

A conventional reservoir is a reservoir where the hydrocarbons flow to the wellbore in a manner in which the system can be characterized by flow through permeable media, where the permeability may or may not have been altered near the wellbore, or flow through permeable media to a permeable (conductive), bi-wing fracture placed in the formation. In addition, the hydrocarbons location in the reservoir are held in place by an upper, impermeable barrier and different reservoir fluids are located vertically based on their density where the movement of one of the reservoir fluid can apply a driving force to another reservoir fluid. A convention reservoir would typically have a matrix permeability greater than about 1 milliDarcy (equivalent to about 1,000 microDarcy).

Tight gas, however, is natural gas that is difficult to access because the matrix permeability is relatively low. Generally, tight gas is in a subterranean formation having a matrix permeability in the range of about 1 milliDarcy to about 0.01 milliDarcy (equivalent to about 10 microDarcy). Conventionally, to produce tight gas it is necessary to find a "sweet spot" where a large amount of gas is accessible, and sometimes to use various means to create a reduced pressure in the well to help draw the gas out of the formation.

In addition, shale can include relatively large amounts of organic material compared with other types of rock. Shale is a sedimentary rock derived from mud. Shale rock is commonly finely laminated (bedded). Particles in shale are commonly clay minerals mixed with tiny grains of quartz eroded from pre-existing rocks. Shale is a type of sedimentary rock that contains clay and minerals such as quartz. Gas is very difficult to produce from shale, however, because the matrix permeability of the shale is often less than about 1 microDarcy.

A reservoir may be located under land or under the seabed off shore. Oil and gas reservoirs are typically located in the range of a few hundred feet (shallow reservoirs) to a few tens of thousands of feet (ultra-deep reservoirs) below the surface of the land or seabed.

Producing Oil and Gas

To produce oil or gas from a reservoir, a wellbore is drilled into a subterranean formation, which may be the reservoir or adjacent to the reservoir. A well includes at least one wellbore. The wellbore refers to the drilled hole, including any cased or uncased portions of the well. The borehole usually refers to the inside wellbore wall, that is, the rock face or wall that bounds the drilled hole. A wellbore can have portions that are vertical, horizontal, or anything in between, and it can have portions that are straight, curved, or branched. The wellhead is the surface termination of a wellbore, which surface may be on land or on a seabed. As used herein, "uphole," "downhole," and similar terms are relative to the direction of the wellhead, regardless of whether a wellbore portion is vertical or horizontal.

Broadly, a zone refers to an interval of rock along a wellbore that is differentiated from surrounding rocks based on hydrocarbon content or other features, such as perforations or other fluid communication with the wellbore, faults, or fractures. The near-wellbore region of a zone is usually considered to include the matrix of the rock within a few inches of the borehole. As used herein, the near-wellbore region of a zone is considered to be anywhere within about 12 inches of the wellbore. The far-field region of a zone is usually considered the matrix of the rock that is beyond the near-wellbore region.

Generally, well services include a wide variety of operations that may be performed in oil, gas, geothermal, or water wells, such as drilling, cementing, completion, and intervention. These well services are designed to facilitate or enhance the production of desirable fluids from or through a subterranean formation.

Drilling is the process of drilling the wellbore. After the hole is drilled, sections of steel pipe, referred to as casing, which are slightly smaller in diameter than the borehole, are placed in at least the uppermost portions of the wellbore. The casing provides structural integrity to the newly drilled borehole.

Cementing is a common well operation. For example, hydraulic cement compositions can be used in cementing operations in which a string of pipe, such as casing or liner, is cemented in a wellbore. The cemented string of pipe isolates different zones of the wellbore from each other and from the surface. Hydraulic cement compositions can be use in primary cementing of the casing or in completion operations. Hydraulic cement compositions can also be utilized in intervention operations, such as in plugging highly permeable zones or fractures in zones that may be producing too much water, plugging cracks or holes in pipe strings, and the like.

Completion is the process of making a well ready for production or injection. This principally involves preparing a zone of the wellbore to the required specifications, running in the production tubing and associated downhole equipment, as well as perforating and stimulating as required.

Intervention is any operation carried out on a well during or at the end of its productive life that alters the state of the well or well geometry, provides well diagnostics, or manages the production of the well. Workover can broadly refer to any kind of well intervention that involves invasive techniques, such as wireline, coiled tubing, or snubbing. More specifically, though, workover refers to the process of pulling and replacing a completion.

As used herein, a "well fluid" broadly refers to any fluid adapted to be introduced into a well for any well-servicing purpose. A well fluid can be, for example, a drilling fluid, a cementing fluid, a treatment fluid, or a spacer fluid. If a well fluid is to be used in a relatively small volume, for example less than about 200 barrels, it is sometimes referred to in the art as a wash, dump, slug, or pill.

As used herein, "into a well" means introduced at least into and through the wellhead. According to various techniques known in the art, equipment, tools, or well fluids can be directed from the wellhead into any desired portion of the wellbore. Additionally, a well fluid can be directed from a portion of the wellbore into the rock matrix of a zone.

Drilling and Drilling Fluids

The well is created by drilling a hole into the earth (or seabed) with a drilling rig that rotates a drill string with a drilling bit attached to the downward end. Usually the borehole is anywhere between about 5 inches (13 cm) to about 36 inches (91 cm) in diameter. The borehole usually is stepped down to a smaller diameter the deeper the wellbore as upper portions are cased or lined, which means that progressively smaller drilling strings and bits must be used to pass through the uphole casing or liner.

While drilling an oil or gas well, a drilling fluid is circulated downhole through a drillpipe to a drill bit at the downhole end, out through the drill bit into the wellbore, and then back uphole to the surface through the annular path between the tubular drillpipe and the borehole. The purpose of the drilling fluid is to maintain hydrostatic pressure in the wellbore, to lubricate the drill string, and to carry rock cuttings out from the wellbore.

The drilling fluid can be water-based or oil-based. Oil-based fluids tend to have better lubricating properties than water-based fluids, nevertheless, other factors can mitigate in favor of using a water-based drilling fluid.

In addition, the drilling fluid may be viscosified to help suspend and carry rock cuttings out from the wellbore. Rock cuttings can range in size from silt-sized particles to chunks measured in centimeters. Carrying capacity refers to the ability of a circulating drilling fluid to transport rock cuttings out of a wellbore. Other terms for carrying capacity include hole-cleaning capacity and cuttings lifting.

Cementing and Hydraulic Cement Compositions

In performing cementing, a hydraulic cement composition is pumped as a fluid (typically in the form of suspension or slurry) into a desired location in the wellbore. For example, in cementing a casing or liner, the hydraulic cement composition is pumped into the annular space between the exterior surfaces of a pipe string and the borehole (that is, the wall of the wellbore). The cement composition is allowed time to set in the annular space, thereby forming an annular sheath of hardened, substantially impermeable cement. The hardened cement supports and positions the pipe string in the wellbore and bonds the exterior surfaces of the pipe string to the walls of the wellbore.

Hydraulic cement is a material that when mixed with water hardens or sets over time because of a chemical reaction with the water. Because this is a chemical reaction with the water, hydraulic cement is capable of setting even under water. The hydraulic cement, water, and any other components are mixed to form a hydraulic cement composition in the initial state of a slurry, which should be a fluid for a sufficient time before setting for pumping the composition into the wellbore and for placement in a desired downhole location in the well.

Well Treatments and Treatment Fluids

Drilling, completion, and intervention operations can include various types of treatments that are commonly performed in a wellbore or subterranean formation. For example, a treatment for fluid-loss control can be used during any of drilling, completion, and intervention operations. During completion or intervention, stimulation is a type of treatment performed to enhance or restore the productivity of oil and gas from a well. Stimulation treatments fall into two main groups: hydraulic fracturing and matrix treatments. Fracturing treatments are performed above the fracture pressure of the subterranean formation to create or extend a highly permeable flow path between the formation and the wellbore. Matrix treatments are performed below the fracture pressure of the formation. Other types of completion or intervention treatments can include, for example, gravel packing, consolidation, and controlling excessive water production.

As used herein, the word "treatment" refers to any treatment for changing a condition of a wellbore or an adjacent subterranean formation. Examples of treatments include fluid-loss control, isolation, stimulation, or conformance control; however, the word "treatment" does not necessarily imply any particular treatment purpose.

A treatment usually involves introducing a treatment fluid into a well. As used herein, a "treatment fluid" is a fluid used in a treatment. Unless the context otherwise requires, the word "treatment" in the term "treatment fluid" does not necessarily imply any particular treatment or action by the fluid. If a treatment fluid is to be used in a relatively small volume, for example less than about 200 barrels, it is sometimes referred to in the art as a slug or pill.

As used herein, a "treatment zone" refers to an interval of rock along a wellbore into which a treatment fluid is directed to flow from the wellbore. Further, as used herein, "into a treatment zone" means into and through the wellhead and, additionally, through the wellbore and into the treatment zone.

The following are some general descriptions of common well treatments and associated treatment fluids. Of course, other well treatments and treatment fluids are known in the art.

Well Treatment—Fluid-Loss Control

Fluid loss refers to the undesirable leakage of a fluid phase of a well fluid into the permeable matrix of a zone, which zone may or may not be a treatment zone. Fluid-loss control refers to treatments designed to reduce such undesirable leakage. Providing effective fluid-loss control for well fluids during certain stages of well operations is usually highly desirable.

The usual approach to fluid-loss control is to substantially reduce the permeability of the matrix of the zone with a fluid-loss control material that blocks the permeability at or near the face of the rock matrix of the zone. For example, the fluid-loss control material may be a particulate that has a size selected to bridge and plug the pore throats of the matrix. All else being equal, the higher the concentration of the particulate, the faster bridging will occur. As the fluid phase carrying the fluid-loss control material leaks into the formation, the fluid-loss control material bridges the pore throats of the matrix of the formation and builds up on the surface of the borehole or fracture face or penetrates only a little into the matrix. The buildup of solid particulate or other fluid-loss control material on the walls of a wellbore or a fracture is referred to as a filter cake. Depending on the nature of a fluid phase and the filter cake, such a filter cake may help block the further loss of a fluid phase (referred to as a filtrate) into the subterranean formation. A fluid-loss control material is specifically designed to lower the volume of a filtrate that passes through a filter medium.

After application of a filter cake, however, it may be desirable to restore permeability into the formation. If the formation permeability of the desired producing zone is not restored, production levels from the formation can be significantly lower. Any filter cake or any solid or polymer filtration into the matrix of the zone resulting from a fluid-loss control treatment must be removed to restore the formation's permeability, preferably to at least its original level. This is often referred to as clean up.

A variety of fluid-loss control materials have been used and evaluated for fluid-loss control and clean-up, including foams, oil-soluble resins, acid-soluble solid particulates, graded salt slurries, linear viscoelastic polymers, and heavy metal-crosslinked polymers. Their respective comparative effects are well documented.

Fluid-loss control materials are sometimes used in drilling fluids or in treatments that have been developed to control fluid loss. A fluid-loss control pill is a treatment fluid that is designed or used to provide some degree of fluid-loss control. Through a combination of viscosity, solids bridging, and cake buildup on the porous rock, these pills oftentimes are able to substantially reduce the permeability of a zone of the subterranean formation to fluid loss. They also generally enhance filter-cake buildup on the face of the formation to inhibit fluid flow into the formation from the wellbore.

Fluid-loss control pills typically comprise an aqueous base fluid and a high concentration of a gelling agent polymer (usually crosslinked), and sometimes, bridging particles, like graded sand, graded salt particulate, or sized calcium carbonate particulate. A commonly used fluid-loss control pills contain high concentrations (100 to 150 lbs/1000 gal) of derivatized hydroxyethylcellulose ("HEC"). HEC is generally accepted as a gelling agent affording minimal permeability damage during completion operations. Normally, HEC polymer solutions do not form rigid gels, but control fluid loss by a viscosity-regulated or filtration mechanism. Some other gelling agent polymers that have been used include xanthan, guar, guar derivatives, carboxymethylhydroxyethylcellulose ("CMHEC"), and starch. Viscoelastic surfactants can also be used.

As an alternative to forming linear polymeric gels for fluid-loss control, crosslinked gels often are used. Crosslinking the gelling agent polymer creates a gel structure that can support solids as well as provide fluid-loss control. Further, crosslinked fluid-loss control pills have demonstrated that they require relatively limited invasion of the formation face to be fully effective. To crosslink the gelling agent polymers, a suitable crosslinking agent that comprises polyvalent metal ions is used. Aluminum, titanium, and zirconium are common examples.

A preferred crosslinkable gelling agent for fluid-loss control pills are graft copolymers of a hydroxyalkyl cellulose, guar, or hydroxypropyl guar that are prepared by a redox reaction with vinyl phosphonic acid. The gel is formed by hydrating the graft copolymer in an aqueous solution containing at least a trace amount of at least one divalent cation. The gel is crosslinked by the addition of a Lewis base or Bronsted-Lowrey base so that pH of the aqueous solution is adjusted from slightly acidic to slightly basic. Preferably, the chosen base is substantially free of polyvalent metal ions. The resulting crosslinked gel demonstrates shear-thinning and rehealing properties that provide relatively easy pumping, while the rehealed gel provides good fluid-loss control upon placement. This gel can be broken by reducing the pH of the fluid or by the use of oxidizers. Some fluid-loss pills of this type are described in U.S. Pat. No. 5,304,620, assigned to Halliburton Energy Services, the relevant disclosure of which is incorporated herein by reference. Fluid-loss control pills of this type are commercially available under the trade name "K-MAX" from Halliburton Energy Services Inc. in Duncan, Okla.

Well Treatment—Acidizing

A widely used stimulation technique is acidizing, in which a treatment fluid including an aqueous acid solution is introduced into the formation to dissolve acid-soluble materials. In this way, hydrocarbon fluids can more easily flow from the formation into the well. In addition, an acid treatment can facilitate the flow of injected treatment fluids from the well into the formation.

Acidizing techniques can be carried out as matrix acidizing procedures or as acid fracturing procedures.

In matrix acidizing, an acidizing fluid is injected from the well into the formation at a rate and pressure below the pressure sufficient to create a fracture in the formation. In sandstone formations, the acid primarily removes or dissolves acid soluble damage in the near wellbore region and is thus classically considered a damage removal technique and not a stimulation technique. In carbonate formations, the goal is to actually a stimulation treatment where in the acid forms conducted channels called wormholes in the formation rock.

Greater details, methodology, and exceptions can be found in "Production Enhancement with Acid Stimulation" 2nd edition by Leonard Kalfayan (PennWell 2008), SPE 129329, SPE 123869, SPE 121464, SPE 121803, SPE 121008, IPTC 10693, 66564-PA, and the references contained therein.

In acid fracturing, an acidizing fluid is pumped into a carbonate formation at a sufficient pressure to cause fracturing of the formation and creating differential (non-uniform) etching fracture conductivity. Greater details, methodology, and exceptions can be found in "Production Enhancement with Acid Stimulation" 2nd edition by Leonard Kalfayan (PennWell 2008), SPE 129329, SPE 123869, SPE 121464, SPE 121803, SPE 121008, IPTC 10693, 66564-PA, and the references contained therein.

Matrix Diversion

Matrix treatments in conventional reservoirs can utilize diversion. True matrix diversion does not apply, however, to ultra-low permeable formations.

For example, in subterranean treatments in conventional reservoirs, it is often desired to treat an interval of a subterranean formation having sections of varying permeability, reservoir pressures and/or varying degrees of formation damage, and thus may accept varying amounts of certain treatment fluids. For example, low reservoir pressure in certain areas of a subterranean formation or a rock matrix or a proppant pack of high permeability may permit that portion to accept larger amounts of certain treatment fluids. It may be difficult to obtain a uniform distribution of the treatment fluid throughout the entire interval. For instance, the treatment fluid may preferentially enter portions of the interval with low fluid flow resistance at the expense of portions of the interval with higher fluid flow resistance. In some instances, these intervals with variable flow resistance may be water-producing intervals. This is different from diversion between different zones. See U.S. application Ser. No. 12/512,232, filed Jul. 30, 2009, entitled "Methods of Fluid Loss Control and Fluid Diversion in Subterranean Formations," which is incorporated by reference.

In addition, relative permeability modifiers (RPMs) can be considered another approach to matrix diversion.

Well Treatment—Hydraulic Fracturing

Hydraulic fracturing, sometimes referred to as fracturing or fracing, is a common stimulation treatment. A treatment fluid adapted for this purpose is sometimes referred to as a fracturing fluid. The fracturing fluid is pumped at a sufficiently high flow rate and pressure into the wellbore and into the subterranean formation to create or enhance a fracture in the subterranean formation. Creating a fracture means making a new fracture in the formation. Enhancing a fracture means enlarging a pre-existing fracture in the formation.

A frac pump is used for hydraulic fracturing. A frac pump is a high-pressure, high-volume pump. Typically, a frac pump is a positive-displacement reciprocating pump. The structure of such a pump is resistant to the effects of pumping abrasive fluids, and the pump is constructed of materials that are resistant to the effects of pumping corrosive fluids. Abrasive fluids are suspensions of hard, solid particulates, such as sand. Corrosive fluids include, for example, acids. The fracturing fluid may be pumped down into the wellbore at high rates and pressures, for example, at a flow rate in excess of 50 barrels per minute (2,100 U.S. gallons per minute) at a pressure in excess of 5,000 pounds per square inch ("psi"). The pump rate and pressure of the fracturing fluid may be even higher, for example, flow rates in excess of 100 barrels per minute and pressures in excess of 10,000 psi are common.

Fracturing a subterranean formation often uses hundreds of thousands of gallons of fracturing fluid or more. Further, it is often desirable to fracture more than one treatment zone of a well. Thus, a high volume of fracturing fluids is often used in fracturing of a well, which means that a low-cost fracturing fluid is desirable. Because of the ready availability and relative low cost of water compared to other liquids, among other considerations, a fracturing fluid is usually water-based.

The creation or extension of a fracture in hydraulic fracturing occurs suddenly. When this happens, the fracturing fluid suddenly has a fluid flow path through the fracture to flow more rapidly away from the wellbore, which may be detected as a change in pressure or fluid flow rate.

A newly-created or newly-extended fracture will tend to close together after the pumping of the fracturing fluid is stopped. To prevent the fracture from closing, a material is usually placed in the fracture to keep the fracture propped open and to provide higher fluid conductivity than the matrix of the formation. A material used for this purpose is referred to as a proppant.

A proppant is in the form of a solid particulate, which can be suspended in the fracturing fluid, carried downhole, and deposited in the fracture to form a proppant pack. The proppant pack props the fracture in an open condition while allowing fluid flow through the permeability of the pack. The proppant pack in the fracture provides a higher-permeability flow path for the oil or gas to reach the wellbore compared to the permeability of the matrix of the surrounding subterranean formation. This higher-permeability flow path increases oil and gas production from the subterranean formation.

A particulate for use as a proppant is usually selected based on the characteristics of size range, crush strength, and solid stability in the types of fluids that are encountered or used in wells. Preferably, a proppant should not melt, dissolve, or otherwise degrade from the solid state under the downhole conditions.

The proppant is selected to be an appropriate size to prop open the fracture and bridge the fracture width expected to be created by the fracturing conditions and the fracturing fluid. If the proppant is too large, it will not easily pass into a fracture and will screenout too early. If the proppant is too small, it will not provide the fluid conductivity to enhance production. See, for example, McGuire and Sikora, 1960. In the case of fracturing relatively permeable or even tight-gas reservoirs, a proppant pack should provide higher permeability than the matrix of the formation. In the case of fracturing ultra-low permeable formations, such as shale formations, a proppant pack should provide for higher permeability than the naturally occurring fractures or other micro-fractures of the fracture complexity.

Appropriate sizes of particulate for use as a proppant are typically in the range from about 8 to about 100 U.S. Standard Mesh. A typical proppant is sand-sized, which geologically is defined as having a largest dimension ranging from about 0.06 millimeters up to about 2 millimeters (mm). (The next smaller particle size class below sand sized is silt, which is defined as having a largest dimension ranging from less than about 0.06 mm down to about 0.004 mm.) As used herein, proppant does not mean or refer to suspended solids, silt, fines, or other types of insoluble solid particulate smaller than about 0.06 mm (about 230 U.S. Standard Mesh). Further, it does not mean or refer to particulates larger than about 3 mm (about 7 U.S. Standard Mesh).

The proppant is sufficiently strong, that is, has a sufficient compressive or crush resistance, to prop the fracture open without being deformed or crushed by the closure stress of the fracture in the subterranean formation. For example, for a proppant material that crushes under closure stress, a 20/40 mesh proppant preferably has an API crush strength of at least 4,000 psi closure stress based on 10% crush fines according to procedure API RP-56, A 12/20 mesh proppant material preferably has an API crush strength of at least 4,000 psi closure stress based on 16% crush fines according to procedure API RP-56. This performance is that of a medium crush-strength proppant, whereas a very high crush-strength proppant would have a crush-strength of about 10,000 psi. In comparison, for example, a 100-mesh proppant material for use in an ultra-low permeable formation such as shale preferably has an API crush strength of at least 5,000 psi closure stress based on 6% crush fines. The higher the closing pressure of the formation of the fracturing application, the higher the strength of proppant is needed. The closure stress depends on a number of factors known in the art, including the depth of the formation.

Further, a suitable proppant should be stable over time and not dissolve in fluids commonly encountered in a well environment. Preferably, a proppant material is selected that will not dissolve in water or crude oil.

Suitable proppant materials include, but are not limited to, sand (silica), ground nut shells or fruit pits, sintered bauxite, glass, plastics, ceramic materials, processed wood, resin coated sand or ground nut shells or fruit pits or other composites, and any combination of the foregoing. Mixtures of different kinds or sizes of proppant can be used as well. In conventional reservoirs, if sand is used, it commonly has a median size anywhere within the range of about 20 to about 100 U.S. Standard Mesh. For a synthetic proppant, it commonly has a median size anywhere within the range of about 8 to about 100 U.S. Standard Mesh.

The concentration of proppant in the treatment fluid depends on the nature of the subterranean formation. As the nature of subterranean formations differs widely, the concentration of proppant in the treatment fluid may be in the range of from about 0.03 kilograms to about 12 kilograms of proppant per liter of liquid phase (from about 0.1 lb/gal to about 25 lb/gal).

Tip Screenout in Fracturing Permeable Formations

The conductivity of propped fractures depends on, among other things, fracture width and fracture permeability. The permeability can be estimated based on the size of the proppant. The width of a fracture depends on the nature of the formation and the specific fracturing conditions.

In relatively permeable formations, it is often desirable to maximize the length of the fractures created by hydraulic fracturing treatments, so that the surface area of the fractures, and therefore the area serviced by the well, may be maximized. In certain frac-packing treatments, particularly in weakly-consolidated highly-permeable sand formations, it may be more desirable to form short, wide fractures that feature high fracture conductivities.

One way of creating such short, wide fractures is with a tip screenout. In a tip screenout, the growth of the fracture length is arrested when the proppant concentration at the tip of the fracture becomes highly concentrated, typically due to fluid leak-off into the surrounding formation. In a fracture tip screenout, the proppant bridges the narrow gaps at the tip of the fracture and are packed into the fracture, thus restricting flow to the fracture tip, which may terminate the extension of the fracture into the formation, among other things, because the hydraulic pressure of the stimulation fluid may not be transmitted from the wellbore to the fracture tip. The concentrated proppant slurry plugs the fracture and prevents additional lengthening of the fracture. Any additional pumping of the proppant slurry beyond this point causes the fracture to widen or balloon and packs the existing fracture length with additional proppant. This results in a relatively short, wide fracture having both high fracture conductivity and a high proppant concentration.

Being able to control the initiation of a fracture tip screenout may be an important aspect of a successful fracturing operation. Without control of the fracture tip screenout, a fracture may not be packed with proppant as needed, e.g., to have the desired fracture width near the wellbore.

Conventionally, to initiate a fracture tip screenout, the flow rate of the fracturing fluid is reduced while increasing proppant concentration therein, with the anticipation that this combination will cause a fracture tip screenout. Design features typically employed in situations in which a tip screenout is desired often involve methods of ensuring that fluid leak-off is high relative to the rate and amount of proppant injection. This can be achieved in a number of ways, including, but not limited to, using a small amount of pad fluid to initiate the fracture, using little or no fluid loss additive, using high proppant concentrations earlier in the treatment, pumping more slowly during the fracturing operation, or some combination thereof. However, this methodology does not consistently cause fracture tip screenouts. While increasing the proppant concentration and decreasing the flow rate does increase the probability that a fracture tip screenout may occur, this methodology assumes that there is one fracture taking all of the fluid. But, where there are competing fractures, the initiation of a fracture tip screenout may be difficult to control and/or predict using conventional methodologies. Pressure transients collected by downhole pressure gauges during frac-packing treatments indicate that tip screenouts often do not occur when and where desired or intended. Instead, the fluid at the tip of the fracture often remains mobile, the fracture tip continues to grow throughout the treatment, and the desired proppant concentration in the fracture is not reached. Because of this, the desired high fracture conductivity may not be obtained.

For example, in deviated wellbores, where only a portion of the perforations communicate with the dominant fracture that is being extended (when using conventional technologies), fluid is lost (e.g., leaking off) into other portions or fractures in the well besides the dominant fracture. Dependent upon the rate of fluid loss into the formation, these conventional methodologies may not successfully generate a tip screenout in the fracture.

Furthermore, the conventional methods cannot predict when the screenout occurs, and, therefore, while it is desirable for the proppant to bridge at the tip of the fracture and pack therein, the bridging of the proppant and thus the screenout may occur anywhere in the fracture. Oftentimes, this may happen near the wellbore, before the high concentration proppant reaches the fracture, causing an undesirable screenout inside the well bore. If the screenout does not occur at the tip, and the fracture is not gradually filled with proppant afterwards, the fracture may not be packed with proppant as desired.

One method of inducing and controlling tip screenout includes pumping an annulus fluid into an annulus, between the subterranean formation and a work string disposed within a wellbore penetrating the subterranean formation, at an annulus flow rate; and reducing the annulus flow rate below a fracture initiation flow point so that the fracture tip screenout is initiated in the one or more fractures in the subterranean formation. U.S. Pat. No. 7,237,612, issued Jul. 3, 2007, titled "Methods of Initiating a fracture Tip Screenout" having for named inventors Jim B. Surjaatmadja, Billy W. McDaniel, Mark Farabee, David Adams, and Loyd East, which is incorporated by reference.

Another method of inducing and controlling tip screenout during a frac-packing treatment comprising injecting a proppant slurry into a subterranean formation, wherein the proppant slurry comprises a proppant material, a fracturing fluid, and degradable particulates and wherein the degradable particulates physically interact with themselves and with the proppant material to aid in inducing tip screenout. U.S. Pat. No. 7,413,017, issued Aug. 19, 2008, titled "Methods and Compositions for Inducing Tip-Screenouts in Frac-Packing Operations" having for named inventors Philip D. Nguyen and Anne M. Culotta, which is incorporated by reference.

Tip screenout requires considerable fluid loss while at fracturing rates. This necessitates a high permeability formation and cannot occur in low permeability formations that have a matrix permeability less than 1,000 microDarcy (equivalent to 1 milliDarcy), much less in ultra-low permeable formations that have a matrix permeability less than 1 microDarcy (equivalent to 0.001 milliDarcy).

Well Treatment—Staged Fracturing and Zone Diversion

Multiple or staged fracturing involves fracturing two or more different zones of a wellbore in succession. Staged hydraulic fracturing operations are commonly performed from horizontal wellbores placed in shale gas reservoirs.

In the context of staged fracturing, diversion techniques are used to divert a fracturing fluid from one zone to a different zone. Diversion techniques fall into two main categories: mechanical diversion and chemical diversion. Mechanical diversion includes the use of mechanical devices, such as ball sealers or packers, to isolate one zone from another and divert a treatment fluid to the desired zone. Chemical diversion includes the use of chemicals to divert a treatment fluid from entering a zone in favor of entering a different zone.

In conventional methods of treating subterranean formations, once the less fluid flow-resistant zone of a subterranean formation has been treated, that zone may be sealed off using a variety of techniques to divert treatment fluids to a more fluid flow-resistant zone of the well. Such techniques may have involved, among other things, the injection of particulates, foams, emulsions, plugs, packers, or blocking polymers (e.g., crosslinked aqueous gels) into the interval so as to plug off high-permeability portions of the subterranean formation once they have been treated, thereby diverting subsequently injected fluids to more fluid flow-resistant portions of the subterranean formation.

For example, near wellbore diversion is a near-wellbore treatment that causes a zone to greatly reduce or stop the taking of fluid so that the fluid is then diverted to enter another zone. This can be accomplished, for example, by plugging wellbore perforations or plugging a near-wellbore proppant pack. According to some techniques known in the art, diversion from one zone to another can be accomplished without stopping the pumping of one or more fracturing fluids into the well.

A fracturing stage includes pumping one or more fracturing fluids into the treatment zone at a rate and pressure above the fracture pressure of the treatment zone. Designing a fracturing stage usually includes determining a designed total pumping time for the stage or determining a designed total pumping volume of fracturing fluid for the fracturing stage. The tail end of a fracturing stage is the last portion of pumping time into the zone or the last portion of the volume of fracturing fluid pumped into the zone. This is usually about the last minute of total pumping time or about the last wellbore volume of a fracturing fluid to be pumped into the zone. The portion of pumping time or fracturing fluid volume that is pumped before the tail end of a fracturing stage reaches into a far-field region of the zone.

A person of skill in the art is able to plan each fracturing stage in detail, subject to unexpected or undesired early screenout or other problems that might be encountered in fracturing a well. A person of skill in the art is able to determine the wellbore volume between the wellhead and the zone. In addition, a person of skill in the art is able to determine the time within a few seconds in which a well fluid pumped into a well should take to reach a zone.

In addition to being designed in advance, the actual point at which a fracturing fluid is diverted from a zone can be determined by a person of skill in the art, including based on observed changes in well pressures or flow rates.

Well Treatment—Gravel Packing

A solid particulate also can be used for gravel packing operations. Gravel packing is commonly used as a sand-control method to prevent production of formation sand from a poorly consolidated subterranean formation. In gravel packing, a mechanical screen is placed in the wellbore and the surrounding annulus packed with a particulate of a specific size designed to prevent the passage of formation sand. The primary objective is to stabilize the formation while causing minimal impairment to well productivity.

The particulate used for this purpose is referred to as "gravel." In the oil and gas field, and as used herein, the term "gravel" is refers to relatively large particles in the sand size classification, that is, particles ranging in diameter from about 0.1 mm up to about 2 mm. Generally, a particulate having the properties, including chemical stability, of a low-strength proppant is used in gravel packing. An example of a commonly used gravel packing material is sand.

A screenout is a condition encountered during some gravel-pack operations wherein the treatment area cannot accept further packing gravel (larger sand). Under ideal conditions, this should signify that the entire void area has been successfully packed with the gravel. However, if screenout occurs earlier than expected in the treatment, it may indicate an incomplete treatment and the presence of undesirable voids within the treatment zone.

Increasing Viscosity of Fluid for Suspending Particulate

Various particulates can be employed in a fluid for use in a well or a fluid can be used to help remove particulates from a well.

For example, during drilling, rock cuttings should be carried by the drilling fluid and flowed out of the wellbore. The rock cuttings typically have specific gravity greater than 2, which is much higher than that of many drilling fluids.

Similarly, a proppant used in fracturing may have a much different density than the fracturing fluid. For example, sand has a specific gravity of about 2.7, where water has a specific gravity of 1.0 at Standard Laboratory conditions of temperature and pressure. A proppant having a different density than water will tend to separate from water very rapidly.

As many well fluids are water-based, partly for the purpose of helping to suspend particulate of higher density, and for other reasons known in the art, the density of the fluid used in a well can be increased by included highly water-soluble salts in the water, such as potassium chloride. However, increasing the density of a well fluid will rarely be sufficient to match the density of the particulate.

Increasing the viscosity of a well fluid can help prevent a particulate having a different specific gravity than an external phase of the fluid from quickly separating out of the external phase.

Emulsion for Increasing Viscosity

The internal-phase droplets of an emulsion disrupt streamlines and require more effort to get the same flow rate. Thus, an emulsion tends to have a higher viscosity than the external phase of the emulsion would otherwise have by itself. This property of an emulsion can be used to help suspend a particulate material in an emulsion. This technique for increasing the viscosity of a liquid can be used separately or in combination with other techniques for increasing the viscosity of a fluid.

As used herein, to "break" an emulsion means to cause the creaming and coalescence of emulsified drops of the internal dispersed phase so that they the internal phase separates out of the external phase. Breaking an emulsion can be accomplished mechanically (for example, in settlers, cyclones, or centrifuges) or with chemical additives to increase the surface tension of the internal droplets.

Viscosity-Increasing Agent

A viscosity-increasing agent is sometimes referred to in the art as a thickener, gelling agent, or suspending agent. There are several kinds of viscosity-increasing agents and related techniques for increasing the viscosity of a fluid.

In general, because of the high volume of fracturing fluid typically used in a fracturing operation, it is desirable to efficiently increase the viscosity of fracturing fluids to the desired viscosity using as little viscosity-increasing agent as possible. In addition, relatively inexpensive materials are preferred. Being able to use only a small concentration of the viscosity-increasing agent requires a lesser amount of the viscosity-increasing agent in order to achieve the desired fluid viscosity in a large volume of fracturing fluid.

Polymers for Increasing Viscosity

Certain kinds of polymers can be used to increase the viscosity of a fluid. In general, the purpose of using a polymer is to increase the ability of the fluid to suspend and carry a particulate material. Polymers for increasing the viscosity of a fluid are preferably soluble in the external phase of a fluid. Polymers for increasing the viscosity of a fluid can be naturally occurring polymers such as polysaccharides, derivatives of naturally occurring polymers, or synthetic polymers.

Water-Soluble Polysaccharides or Derivatives for Increasing Viscosity

Fracturing fluids are usually water-based. Efficient and inexpensive viscosity-increasing agents for water include certain classes of water-soluble polymers.

Water-soluble polysaccharides are often used to the extent of at least 10 mg per liter in water at 25° C. More preferably, the water-soluble polymer is also used to the extent of at least 10 mg per liter in an aqueous sodium chloride solution of 32 grams sodium chloride per liter of water at 25° C. As will be appreciated by a person of skill in the art, the solubility or dispersability in water of a certain kind of polymeric material may be dependent on the salinity or pH of the water. Accordingly, the salinity or pH of the water can be modified to facilitate the solubility or dispersability of the water-soluble polymer. In some cases, the water-soluble polymer can be mixed with a surfactant to facilitate its solubility in the water or salt solution utilized.

The water-soluble polymer can have an average molecular weight in the range of from about 50,000 to 20,000,000, most preferably from about 100,000 to about 3,000,000.

Typical water-soluble polymers used in well treatments are water-soluble polysaccharides and water-soluble synthetic polymers (e.g., polyacrylamide). The most common water-soluble polysaccharide employed in well treatments is guar and its derivatives.

A polysaccharide can be classified as being non-helical or helical (or random coil type) based on its solution structure in aqueous liquid media. Examples of non-helical polysaccharides include guar, guar derivatives, and cellulose derivatives. Examples of helical polysaccharides include xanthan, diutan, and scleroglucan, and derivatives of any of these.

As used herein, a "polysaccharide" can broadly include a modified or derivative polysaccharide. As used herein, "modified" or "derivative" means a compound or substance formed by a chemical process from a parent compound or substance, wherein the chemical skeleton of the parent exists in the derivative. The chemical process preferably includes at most a few chemical reaction steps, and more preferably only one or two chemical reaction steps. As used herein, a "chemical reaction step" is a chemical reaction between two chemical reactant species to produce at least one chemically different species from the reactants (regardless of the number of transient chemical species that may be formed during the reaction). An example of a chemical step is a substitution reaction. Substitution on a polymeric material may be partial or complete.

A guar derivative can be selected from the group consisting of, for example, a carboxyalkyl derivative of guar, a hydroxyalkyl derivative of guar, and any combination thereof. Preferably, the guar derivative is selected from the group consisting of carboxymethylguar, carboxymethylhydroxyethylguar, hydroxyethylguar, carboxymethylhydroxypropylguar, ethylcarboxymethylguar, and hydroxypropylmethylguar.

A cellulose derivative can be selected from the group consisting of, for example, a carboxyalkyl derivative of cellulose, a hydroxyalkyl derivative of cellulose, and any combination thereof. Preferably, the cellulose derivative is selected from the group consisting of carboxymethylcellulose, carboxymethylhydroxyethylcellulose, hydroxyethylcellulose, methylcellulose, ethylcellulose, ethylcarboxymethylcellulose, and hydroxypropylmethylcellulose.

Crosslinking of Polysaccharide to Increase Viscosity of a Fluid or Form a Gel

The viscosity of a fluid at a given concentration of viscosity-increasing agent can be greatly increased by crosslinking the viscosity-increasing agent. A crosslinking agent, sometimes referred to as a crosslinker, can be used for this purpose. One example of a crosslinking agent is the borate ion. If a polysaccharide is crosslinked to a sufficient extent, it can form a gel with water. Gel formation is based on a number of factors including the particular polymer and concentration thereof, the particular crosslinker and concentration thereof, the degree of crosslinking, temperature, and a variety of other factors known to those of ordinary skill in the art.

A base gel is a fluid that includes a viscosity-increasing agent, such as guar, but that excludes crosslinking agents. Typically, a base gel is a fluid that is mixed with another fluid containing a crosslinker, wherein the mixed fluid is adapted to form a gel after injection downhole at a desired time in a well treatment. A base gel can be used, for example, as the external phase of an emulsion.

Breaker for Polysaccharide or Crosslinked Polysaccharide

Drilling or treatment fluids also commonly include a breaker for a polysaccharide or crosslinked polysaccharide. In this context of viscosity increase provided by a use of a polysaccharide, the term break or breaker as used herein refers to a reduction in the viscosity of a fluid or gel by some breaking of the polymer backbones or some breaking or reversing of the crosslinks between polymer molecules. No particular mechanism is necessarily implied by the term. A breaker for this purpose can be, for example, an acid, a base, an oxidizer, an enzyme, a chelating agent for a metal crosslinker, an azo compound, or a combination of these. The acids, oxidizers, or enzymes can be in the form of delayed-release or encapsulated breakers.

Examples of such suitable breakers for treatment fluids of the present invention include, but are not limited to, sodium chlorites, hypochlorites, perborate, persulfates, and peroxides (including organic peroxides). Other suitable breakers include, but are not limited to, suitable acids and peroxide breakers, delinkers, as well as enzymes that may be effective in breaking viscosified treatment fluids. In some preferred embodiments, the breaker may be citric acid, tetrasodium EDTA, ammonium persulfate, or cellulose enzymes. A breaker may be included in a treatment fluid of the present invention in an amount and form sufficient to achieve the desired viscosity reduction at a desired time. The breaker may be formulated to provide a delayed break, if desired. For example, a suitable breaker may be encapsulated if desired. Suitable encapsulation methods are known to those skilled in the art. One suitable encapsulation method involves coating the selected breaker in a porous material that allows for release of the breaker at a controlled rate. Another suitable encapsulation method that may be used involves coating the chosen breakers with a material that will degrade when downhole so as to release the breaker when desired. Resins that may be suitable include, but are not limited to, polymeric materials that will degrade when downhole.

A treatment fluid can optionally comprise an activator or a retarder to, among other things, optimize the break rate provided by a breaker. Any known activator or retarder that is compatible with the particular breaker used is suitable for use in the present invention. Examples of such suitable activators include, but are not limited to, acid generating materials, chelated iron, copper, cobalt, and reducing sugars. Examples of suitable retarders include sodium thiosulfate, methanol, and diethylenetriamine.

In the case of a crosslinked viscosity-increasing agent, for example, one way to diminish the viscosity is by breaking the crosslinks. For example, the borate crosslinks in a borate-crosslinked gel can be broken by lowering the pH of the fluid. At a pH above 8, the borate ion exists and is available to crosslink and cause gelling. At a lower pH, the borate ion reacts with proton and is not available for crosslinking, thus, an increase in viscosity due to borate crosslinking is reversible.

Viscosifying Surfactants (i.e. Viscoelastic Surfactants)

It should be understood that merely increasing the viscosity of a fluid may only slow the settling or separation of distinct phases and does not necessarily gel the fluid.

Certain viscosity-increasing agents can also help suspend a particulate material by increasing the elastic modulus of the fluid. The elastic modulus is the measure of a substance's tendency to be deformed non-permanently when a force is applied to it. The elastic modulus of a fluid, commonly referred to as G', is a mathematical expression and defined as the slope of a stress versus strain curve in the elastic deformation region. G' is expressed in units of pressure, for example, Pa (Pascals) or dynes/cm$^2$. As a point of reference, the elastic modulus of water is negligible and considered to be zero. An example of a viscosity-increasing agent that also increases the elastic modulus of a fluid is a viscoelastic surfactant.

An example of a viscosity-increasing agent that is also capable of increasing the suspending capacity of a fluid is to use a viscoelastic surfactant. As used herein, the term "viscoelastic surfactant" refers to a surfactant that imparts or is capable of imparting viscoelastic behavior to a fluid due, at least in part, to the association of surfactant molecules to form viscosifying micelles. These viscoelastic surfactants may be cationic, anionic, or amphoteric in nature. The viscoelastic surfactants can comprise any number of different compounds, including methyl ester sulfonates (e.g., as described in U.S. patent application Ser. Nos. 11/058,660, 11/058,475, 11/058,612, and 11/058,611, filed Feb. 15, 2005, the relevant disclosures of which are incorporated herein by reference), hydrolyzed keratin (e.g., as described in U.S. Pat. No. 6,547,871, the relevant disclosure of which is incorporated herein by reference), sulfosuccinates, taurates, amine oxides, ethoxylated amides, alkoxylated fatty acids, alkoxylated alcohols (e.g., lauryl alcohol ethoxylate, ethoxylated nonyl phenol), ethoxylated fatty amines some of which are described in U.S. Pat. Nos. 4,061,580, 4,324,669, and 4,215,001 the relevant disclosures of which are incorporated herein by reference, ethoxylated alkyl amines (e.g., cocoalkylamine ethoxylate), betaines, modified betaines, alkylamidobetaines (e.g., cocoamidopropyl betaine), quaternary ammonium compounds (e.g., trimethyltallowammonium chloride, trimethylcocoammonium chloride), derivatives thereof, and combinations thereof.

Suitable viscoelastic surfactants may comprise mixtures of several different compounds, including but not limited to: mixtures of an ammonium salt of an alkyl ether sulfate, a cocoamidopropyl betaine surfactant, a cocoamidopropyl dimethylamine oxide surfactant, sodium chloride, and water; mixtures of an ammonium salt of an alkyl ether sulfate surfactant, a cocoamidopropyl hydroxysultaine surfactant, a cocoamidopropyl dimethylamine oxide surfactant, sodium chloride, and water; mixtures of an ethoxylated alcohol ether sulfate surfactant, an alkyl or alkene amidopropyl betaine surfactant, and an alkyl or alkene dimethylamine oxide surfactant; aqueous solutions of an alpha-olefinic sulfonate surfactant and a betaine surfactant; and combinations thereof. Examples of suitable mixtures of an ethoxylated alcohol ether sulfate surfactant, an alkyl or alkene amidopropyl betaine surfactant, and an alkyl or alkene dimethylamine oxide surfactant are described in U.S. Pat. No. 6,063,738, the relevant disclosure of which is incorporated herein by reference. Examples of suitable aqueous solutions of an alpha-olefinic sulfonate surfactant and a betaine surfactant are described in U.S. Pat. No. 5,879,699, the relevant disclosure of which is incorporated herein by reference.

Examples of commercially-available viscoelastic surfactants suitable for use in the present invention can include, but are not limited to, Mirataine BET-O 30™ (an oleamidopropyl betaine surfactant available from Rhodia Inc., Cranbury, N.J.), Aromox APA-T (amine oxide surfactant available from Akzo Nobel Chemicals, Chicago, Ill.), Ethoquad O/12 PG™ (a fatty amine ethoxylate quat surfactant available from Akzo Nobel Chemicals, Chicago, Ill.), Ethomeen T/12™ (a fatty amine ethoxylate surfactant available from Akzo Nobel Chemicals, Chicago, Ill.), Ethomeen S/12 fatty amine ethoxylate surfactant available from Akzo Nobel Chemicals, Chicago, Ill.), and Rewoteric AM TEG tallow dihydroxyethyl betaine amphoteric surfactant available from Degussa Corp., Parsippany, N.J.). See, for example, U.S. Pat. No. 7,727,935, issued Jun. 1, 2010, incorporated herein by reference.

Viscous Fluid Damage to Permeability

In the fracturing of conventional reservoirs having relatively high permeability, viscous fluids used for carrying a proppant can damage the permeability of the proppant pack or the subterranean formation near the fracture. For example, a fracturing fluid may be or include a gel that is deposited in the fracture. The fluid may include surfactants that leave unbroken micelles in the fracture or change the wettability of the formation in the region of the fracture. The higher the viscosity of the fracturing fluid, the more likely it is to damage the permeability of a proppant pack or formation.

Breakers are utilized in many treatments to mitigate fluid damage in the fracture. However, breakers and other treatments are subject to variability of results, they add expense and complication to a fracture treatment, and in all cases still leave at least some fluid damage in the fracture.

In addition, the chemistry of fracturing gels, including the crosslinking of gels, creates complications when designing fracture treatments for a broad range of temperatures. After a fracture treatment, fracturing fluid that flows back to the surface must be disposed of, and the more fluid that is utilized in the treatment the greater the disposal risk and expense. Accordingly, in the fracturing of conventional reservoirs where the matrix permeability allows the fracturing fluid to enter the matrix of the formation rock, it is often desirable to minimize fluid loss into the formation.

Other Uses of Polymers in Well Fluids, for Example, as Friction Reducer

There are other uses for a polymers in a well fluid. For example, a polymer may be used as a friction reducer.

During the drilling, completion and stimulation of subterranean wells, well fluids are often pumped through tubular structures (e.g., pipes, coiled tubing, etc.). A considerable amount of energy may be lost due to turbulence in the treatment fluid. Because of these energy losses, additional horsepower may be necessary to achieve the desired treatment. To reduce these energy losses, certain polymers (referred to herein as "friction-reducing polymers") have been included in these treatment fluids.

For example, one type of hydraulic fracturing treatment that may utilize friction-reducing polymers is commonly referred to as "high-rate water fracturing" or "slick water fracturing." As will be appreciated by those of ordinary skill in the art, fracturing fluids used in these high-rate water-fracturing systems are generally not gels. As such, in high-rate water fracturing, fluid velocity rather than viscosity is relied on for proppant transport. Additionally, while fluids used in high-rate water fracturing may contain a friction-reducing polymer, the friction-reducing polymer is generally included in the fracturing fluid in an amount sufficient to provide the desired friction reduction without gel formation. Gel formation would cause an undesirable increase in fluid viscosity that would result in increased pumping horsepower requirements. More preferably, a friction-reducing polymer is used in an amount that is sufficient to provide the desired friction reduction without appreciably viscosifying the fluid and usually without a crosslinker. As a result, the fracturing fluids used in these high-rate water-fracturing operations generally have a lower viscosity than conventional fracturing fluids. Typically, a well fluid in which a polymer is used as a friction reducer has a viscosity in the range of about 0.7 cP to about 10 cP. For the purposes of this disclosure, viscosities are measured at room temperature using a FANN® Model 35 viscometer at 300 rpm with a 1/5 spring.

An example of a stimulation operation that may utilize friction reducing polymers is hydraulic fracturing. Hydraulic fracturing is a process commonly used to increase the flow of desirable fluids, such as oil and gas, from a portion of a subterranean formation. In hydraulic fracturing, a fracturing fluid may be introduced into the subterranean formation at or above a pressure sufficient to create or enhance one or more fractures in the formation. Enhancing a fracture may include enlarging a pre-existing fracture in the formation. To reduce frictional energy losses within the fracturing fluid, friction-reducing polymers may be included in the fracturing fluid. One type of hydraulic fracturing treatment that may utilize friction-reducing polymers is commonly referred to as "high rate water fracturing" or "slick water fracturing." As will be appreciated by those of ordinary skill in the art, fracturing fluids used in these high rate water-fracturing systems are generally not gels. As such, in high rate water fracturing, velocity rather than the fluid viscosity is relied on for proppant transport. Additionally, while fluids used in high rate water fracturing may contain a friction-reducing polymer, the friction-reducing polymer is generally included in the fracturing fluid in an amount sufficient to provide the desired friction reduction without gel formation. Gel formation would cause an undesirable increase in fluid viscosity that would, in return, result in increased horsepower requirements.

Suitable friction reducing polymers should reduce energy losses due to turbulence within the treatment fluid. Those of ordinary skill in the art will appreciate that the friction reducing polymer(s) included in the treatment fluid should have a molecular weight sufficient to provide a desired level of friction reduction. In general, polymers having higher molecular weights may be needed to provide a desirable level of friction reduction. By way of example, the average molecular weight of suitable friction reducing polymers may be at least about 2,500,000, as determined using intrinsic viscosities. In certain embodiments, the average molecular weight of suitable friction reducing polymers may be in the range of from about 7,500,000 to about 20,000,000. Those of ordinary skill in the art will recognize that friction-reducing polymers having molecular weights outside the listed range may still provide some degree of friction reduction. Typically, friction-reducing polymers are linear and flexible, for example, having a persistence length<10 nm.

A wide variety of friction reducing polymers may be suitable for use with the present invention. In certain embodiments, the friction-reducing polymer may be a synthetic polymer. Additionally, for example, the friction-reducing polymer may be an anionic polymer or a cationic polymer, in accordance with embodiments of the present invention.

By way of example, suitable synthetic polymers may comprise any of a variety of monomeric units, including acrylamide, acrylic acid, 2-acrylamido-2-methylpropane sulfonic acid, N,N-dimethylacrylamide, vinyl sulfonic acid, N-vinyl acetamide, N-vinyl formamide, itaconic acid, methacrylic acid, acrylic acid esters, methacrylic acid esters, quaternized aminoalkyl acrylate, such as a copolymer of acrylamide and dimethylaminoethyl acrylate quaternized with benzyl chloride, and mixtures thereof.

Examples of suitable friction reducing polymers are described in U.S. Pat. No. 6,784,141, U.S. patent application Ser. No. 11/156,356, U.S. patent application Ser. No. 11/300, 614, and U.S. patent application Ser. No. 11/300,615, the disclosure of which is incorporated herein by reference. Combinations of suitable friction reducing polymers may also be suitable for use.

One example of a suitable anionic friction-reducing polymer is a polymer comprising acrylamide and acrylic acid. The acrylamide and acrylic acid may be present in the polymer in any suitable concentration. An example of a suitable anionic friction reducing polymer may comprise acrylamide in an amount in the range of from about 5% to about 95% and acrylic acid in an amount in the range of from about 5% to about 95%. Another example of a suitable anionic friction-reducing polymer may comprise acrylamide in an amount in the range of from about 60% to about 90% by weight and acrylic acid in an amount in the range of from about 10% to about 40% by weight. Another example of a suitable anionic friction-reducing polymer may comprise acrylamide in an amount in the range of from about 80% to about 90% by weight and acrylic acid in an amount in the range of from about 10% to about 20% by weight. Yet another example of a suitable anionic friction-reducing polymer may comprise acrylamide in an amount of about 85% by weight and acrylic acid in an amount of about 15% by weight. As previously mentioned, one or more additional monomers may be included in the anionic friction reducing polymer comprising acrylamide and acrylic acid. By way of example, the additional monomer(s) may be present in the anionic friction-reducing polymer in an amount up to about 20% by weight of the polymer.

Suitable friction-reducing polymers may be in an acid form or in a salt form. As will be appreciated, a variety of salts may be prepared, for example, by neutralizing the acid form of the acrylic acid monomer or the 2-acrylamido-2-methylpropane sulfonic acid monomer. In addition, the acid form of the polymer may be neutralized by ions present in the treatment fluid. As used herein, the term "polymer" is intended to refer to the acid form of the friction-reducing polymer, as well as its various salts.

As will be appreciated, the friction-reducing polymers suitable for use in the present technique may be prepared by any suitable technique. For example, the anionic friction-reducing polymer comprising acrylamide and acrylic acid may be prepared through polymerization of acrylamide and acrylic acid or through hydrolysis of polyacrylamide (e.g., partially hydrolyzed polyacrylamide). See, for example, U.S. Pat. Nos. 7,846,878 and 7,806,185, which are incorporated by reference.

Spacer Fluids

A spacer fluid is a fluid used to physically separate one special-purpose fluid from another. Special-purpose fluids are typically prone to contamination, so a spacer fluid compatible with each is used between the two. A spacer fluid is used when changing well fluids used in a well. For example, a spacer fluid is used to change from a drilling fluid during drilling a well to a cement slurry during cementing operations in the well. In case of an oil-based drilling fluid, it should be kept separate from a water-based cementing fluid. In changing to the latter operation, a chemically treated water-based spacer fluid is usually used to separate the drilling fluid from the cement slurry. Another example is using a spacer fluid to separate two different treatment fluids.

Well Fluid Additives

A well fluid can contain additives that are commonly used in oil field applications, as known to those skilled in the art. These include, but are not necessarily limited to, inorganic water-soluble salts, breaker aids, surfactants, oxygen scavengers, alcohols, scale inhibitors, corrosion inhibitors, fluid-loss additives, oxidizers, water control agents (such as relative permeability modifiers), consolidating agents, proppant flowback control agents, conductivity enhancing agents, and bactericides.

Variations in Well Fluids over Time

Unless the specific context otherwise requires, a "well fluid" refers to the specific properties and composition of a fluid at the time the fluid is being introduced into a well. In addition, it should be understood that, during the course of a well operation such as drilling, cementing, completion, or intervention, or during a specific treatment such as fluid-loss control, hydraulic fracturing, or a matrix treatment, the specific properties and composition of a type of well fluid can be varied or several different types of well fluids can be used. For example, the compositions can be varied to adjust viscosity or elasticity of the well fluids to accommodate changes in the concentrations of proppant to be carried down to the subterranean formation from initial packing of the fracture to tail-end packing. It can also be desirable to accommodate expected changes in temperatures encountered by the well fluids during the course of the treatment. By way of another example, it can be desirable to accommodate the longer duration that the first treatment fluid may need to maintain viscosity before breaking compared to the shorter duration that a later-introduced treatment fluid may need to maintain viscosity before breaking. Changes in concentration of the proppant, viscosity-increasing agent, or other additives in the various treatment fluids of a treatment operation can be made in stepped changes of concentrations or ramped changes of concentrations.

Continuum Mechanics and Rheology

One of the purposes of identifying the physical state of a substance and measuring viscosity or other physical characteristics of a fluid is to establish whether it is pumpable. In the context of oil and gas production, the pumpability of a fluid is with particular reference to the ranges of physical conditions that may be encountered at a wellhead and with the types and sizes of pumps available to be used for pumping fluids into a well. Another purpose is to determine what the physical state of the substance and its physical properties will be during pumping through a wellbore and under other downhole conditions in the well, including over time and changing temperatures, pressures, and shear rates. For example, in some applications, a well fluid forms or becomes a higher viscosity fluid or gel under downhole conditions that later is "broken" back to a lower viscosity fluid.

Continuum mechanics is a branch of mechanics that deals with the analysis of the kinematics and the mechanical behavior of materials modeled as a continuous mass on a large scale rather than as distinct particles. Fluid mechanics is a branch of continuum mechanics that studies the physics of continuous materials that take the shape of their container. Rheology is the study of the flow of matter: primarily in the liquid state, but also as "soft solids" or solids under conditions in which they respond with plastic flow rather than deforming elastically in response to an applied force. It applies to substances that have a complex structure, such as fluid suspensions, gels, etc. The flow of such substances cannot be fully characterized by a single value of viscosity, which varies with temperature, pressure, and other factors. For example, ketchup can have its viscosity reduced by shaking (or other forms of mechanical agitation) but water cannot.

Physical States (Phases)

The common physical states of matter include solid (fixed shape and volume), liquid (fixed volume and shaped by a container), and gas (dispersing in a container). Distinctions among these physical states are based on differences in intermolecular attractions. Solid is the state in which intermolecular attractions keep the molecules in fixed spatial relationships. Liquid is the state in which intermolecular attractions keep molecules in proximity (low tendency to disperse), but do not keep the molecules in fixed relationships. Gas is that state in which the molecules are comparatively separated and intermolecular attractions have relatively little effect on their respective motions (high tendency to disperse).

In addition, as used herein, a solid includes a plastic material, that is, a material that has plasticity. Plasticity describes the deformation of a material undergoing non-reversible changes of shape in response to applied forces.

As used herein, "phase" is used in the same sense as physical state, regardless of geometric extent of the phase or size of a particle.

The physical state of a substance is based on thermodynamics. Thermodynamics is the science of energy conversion involving heat, mechanical work, and other forms of energy.

It studies and interrelates variables, such as temperature, volume, pressure, and friction, which describe physical, thermodynamic systems.

As used herein, if not otherwise specifically stated, the physical state (phase) or other physical properties of a material are determined at a temperature of 77° F. (25° C.) and a pressure of 1 atmosphere (Standard Laboratory Conditions) and no applied deformation force or shear (that is, not other such force than that of natural gravity).

Particles

As used herein, a "particle" refers a body having a finite mass and sufficient cohesion such that it can be considered as an entity but having relatively small dimensions. As used herein, a particle can be of any size ranging from molecular scale particles to macroscopic particles, depending on context. A particle can be in any physical state. For example, a particle of a substance in a solid state can be as small as a few molecules on the scale of nanometers up to a large particle on the scale of a few millimeters, such as large grains of sand. Similarly, a particle of a substance in a liquid state can be as small as a few molecules on the scale of nanometers or a large drop on the scale of a few millimeters. A particle of a substance in a gas state is a single atom or molecule that is separated from other atoms or molecules such that intermolecular attractions have relatively little effect on their respective motions.

Particulate

As used herein, "particulate" or "particulate material" refers to matter in the physical form of distinct particles. A particulate is a grouping of particles based on common characteristics, including chemical composition and particle size range, particle size distribution, or median particle size. As used herein, a particulate is a grouping of particles having similar chemical composition and particle size ranges anywhere in the range of about 1 micrometer (e.g., microscopic clay or silt particles) to about 3 millimeters (e.g., large grains of sand).

A particulate will have a particle size distribution ("PSD"). As used herein, "the size" of a particulate can be determined by methods known to persons skilled in the art.

Solid Particulate

A particulate can be of solid or liquid particles. As used herein, however, unless the context otherwise requires, particulate refers to a solid particulate. Of course, a solid particulate is a particulate of particles that are in the solid physical state, that is, the constituent atoms, ions, or molecules are sufficiently restricted in their relative movement to result in a fixed shape for each of the particles.

One way to measure the approximate particle size distribution of a solid particulate is with graded screens. A solid particulate material will pass through some specific mesh (that is, have a maximum size; larger pieces will not fit through this mesh) but will be retained by some specific tighter mesh (that is, a minimum size; pieces smaller than this will pass through the mesh). This type of description establishes a range of particle sizes. A "+" before the mesh size indicates the particles are retained by the sieve, while a "−" before the mesh size indicates the particles pass through the sieve. For example, −70/+140 means that 90% or more of the particles will have mesh sizes between the two values.

Particulate materials are sometimes described by a single mesh size, for example, 100 U.S. Standard mesh. If not otherwise stated, a reference to a single particle size means about the mid-point of the industry accepted mesh size range for the particulate.

Particulate smaller than about 400 U.S. Standard Mesh is usually measured or separated according to other methods because small forces such as electrostatic forces can interfere with separating tiny particulate sizes using a wire mesh.

Udden-Wentworth Scale for Particulate Sediments

The most commonly-used grade scale for classifying the diameters of sediments in geology is the Udden-Wentworth scale. According to this scale, a solid particulate having particles smaller than 2 mm in diameter is classified as sand, silt, or clay. Sand is a detrital grain between 2 mm (equivalent to 2,000 micrometers) and 0.0625 mm (equivalent to 62.5 micrometers) in diameter. (Sand is also a term sometimes used to refer to quartz grains or for sandstone.) Silt refers to particulate between 74 micrometers (equivalent to about −200 U.S. Standard mesh) and about 2 micrometers. Clay is a particulate smaller than 0.0039 mm (equivalent to 3.9 μm).

Dispersions

A substance can have more than one phase. A dispersion is a system in which particles of a substance of one state are dispersed in another substance of a different composition or physical state. In addition, phases can be nested. If a substance has more than one phase, the most external phase is referred to as the continuous phase of the substance as a whole, regardless of the number of different internal phases or nested phases.

A dispersion can be classified a number of different ways, including based on the size of the dispersed particles, the uniformity or lack of uniformity of the dispersion, whether or not precipitation occurs, and the presence of Brownian motion. For example, a dispersion can be considered to be homogeneous or heterogeneous based on being a solution or not, and if not a solution, based on the size of the dispersed particles (which can refer to droplet size in the case of a dispersed liquid phase).

Classification of Dispersions: Homogeneous and Heterogeneous

A dispersion is considered to be homogeneous if the dispersed particles are dissolved in solution or the particles are less than about 1 nanometer in size.

A solution is a special type of homogeneous mixture. Solvation is the process of attraction and association of molecules of a solvent with molecules or ions of a solute. A solution is homogeneous because the ratio of solute to solvent is the same throughout the solution and because solute will never settle out of solution, even under powerful centrifugation. This is due to intermolecular attraction between the solvent and the solute. An aqueous solution, for example, saltwater, is a homogenous solution in which water is the solvent and salt is the solute.

Even if not dissolved, a dispersion is considered to be homogeneous if the dispersed particles are less than about 1 nanometer in size.

A dispersion is considered to be heterogeneous if the dispersed particles are not dissolved or are greater than about 1 nanometer in size. (For reference, the diameter of a molecule of toluene is about 1 nm).

Heterogeneous dispersions can have gas, liquid, or solid as an external phase. An example of a suspension of solid particulate dispersed in a gas phase would be an aerosol, such as smoke. In case the dispersed-phase particles are liquid in an external phase that is another liquid, this kind of heterogeneous dispersion is more particularly referred to as an emulsion. Suspensions and emulsions are commonly used as well fluids.

Classification of Heterogeneous Dispersions: Colloids and Suspensions

Heterogeneous dispersions can be further classified based on the dispersed particle size.

A heterogeneous dispersion is a "colloid" where the dispersed particles range up to about 1 micrometer (1,000 nanometers) in size. Typically, the dispersed particles of a colloid have a diameter of between about 5 to about 200 nanometers. Such particles are normally invisible to an optical microscope, though their presence can be confirmed with the use of an ultramicroscope or an electron microscope. In the cases where the external phase of a dispersion is a liquid, for a colloidal fluid the dispersed particles are so small that they do not settle.

A heterogeneous dispersion is a "suspension" where the dispersed particles are larger than about 1 micrometer. Such particles can be seen with a microscope, or if larger than about 100 micrometers (0.1 mm), with the unaided human eye. Unlike colloids, however, the dispersed particles of a suspension in a liquid external phase may eventually separate on standing, e.g., settle in cases where the particles have a higher density than the liquid phase. Suspensions having a liquid external phase are essentially unstable from a thermodynamic point of view; however, they can be kinetically stable over a long period depending on temperature and other conditions.

Gel and Deformation

The substance of a gel is a colloidal dispersion. A gel is formed by a network of interconnected molecules, such as of a crosslinked polymer or of micelles, which at the molecular level are attracted to molecules in liquid form. The network gives a gel phase its structure (apparent yield point) and contributes to stickiness (tack). By weight, the substance of gels is mostly liquid, yet they behave like solids due to the three-dimensional network with the liquid. At the molecular level, a gel is a dispersion in which the network of molecules is continuous and the liquid is discontinuous.

A gel is a semi-solid, jelly-like state or phase that can have properties ranging from soft and weak to hard and tough. Shearing stresses below a certain finite value fail to produce permanent deformation. The minimum shear stress which will produce permanent deformation is known as the shear or gel strength of the gel.

A gel is considered to be a single phase because the intermolecular attractions between the molecules of the network and the molecules of the liquid contribute to its semi-solid, jelly-like properties.

Fluid and Apparent Viscosity

The substance of a fluid can be a single chemical substance or a dispersion. In general, a fluid is an amorphous substance that is or has a continuous phase of particles that are smaller than about 1 micrometer that tends to flow and to conform to the outline of its container.

Examples of fluids are gases and liquids. A gas (in the sense of a physical state) refers to an amorphous substance that has a high tendency to disperse (at the molecular level) and a relatively high compressibility. A liquid refers to an amorphous substance that has little tendency to disperse (at the molecular level) and relatively high incompressibility. The tendency to disperse is related to Intermolecular Forces (also known as van der Waal's Forces). (A continuous mass of a particulate, e.g., a powder or sand, can tend to flow as a fluid depending on many factors such as particle size distribution, particle shape distribution, the proportion and nature of any wetting liquid or other surface coating on the particles, and many other variables; nevertheless, as used herein, a fluid does not refer to a continuous mass of particulate. The sizes of the solid particles of a mass of a particulate are too large to be appreciably affected by the range of Intermolecular Forces.)

Viscosity is the resistance of a fluid to flow. In everyday terms, viscosity is "thickness" or "internal friction." Thus, pure water is "thin," having a relatively low viscosity whereas honey is "thick," having a relatively higher viscosity. Put simply, the less viscous the fluid is, the greater its ease of movement (fluidity). More precisely, viscosity is defined as the ratio of shear stress to shear rate.

A Newtonian fluid (named after Isaac Newton) is a fluid for which stress versus strain rate curve is linear and passes through the origin. The constant of proportionality is known as the viscosity. Examples of Newtonian fluids include water and most gases. Newton's law of viscosity is an approximation that holds for some substances but not others.

Non-Newtonian fluids exhibit a more complicated relationship between shear stress and velocity gradient (i.e., shear rate) than simple linearity. Thus, there exist a number of forms of non-Newtonian fluids. Shear thickening fluids have an apparent viscosity that increases with the rate of shear. Shear thinning fluids have a viscosity that decreases with the rate of shear. Thixotropic fluids become less viscous over time when shaken, agitated, or otherwise stressed. Rheopectic fluids become more viscous over time when shaken, agitated, or otherwise stressed. A Bingham plastic is a material that behaves as a solid at low stresses but flows as a viscous fluid at high stresses.

Most well fluids are non-Newtonian fluids. Accordingly, the apparent viscosity of a fluid applies only under a particular set of conditions including shear stress versus shear rate, which must be specified or understood from the context. In the oilfield and as used herein, unless the context otherwise requires it is understood that a reference to viscosity is actually a reference to an apparent viscosity. Apparent viscosity is commonly expressed in units of centipoise ("cP").

Like other physical properties, the viscosity of a Newtonian fluid or the apparent viscosity of a non-Newtonian fluid is highly dependent on the physical conditions, primarily temperature and pressure. Accordingly, unless otherwise stated, the viscosity or apparent viscosity of a fluid is measured under Standard Laboratory Conditions.

There are numerous ways of measuring and modeling viscous properties, and new developments continue to be made. The methods depend on the type of fluid for which viscosity is being measured. A typical method for quality assurance or quality control (QA/QC) purposes uses a couette device, such as a Fann Model 50 viscometer, that measures viscosity as a function of time, temperature, and shear rate. The viscosity-measuring instrument can be calibrated using standard viscosity silicone oils or other standard viscosity fluids.

Due to the geometry of most common viscosity-measuring devices, however, solid particulate, such as proppant or gravel used in certain well treatments, would interfere with the measurement on some types of measuring devices. Therefore, the viscosity of a fluid containing such solid particulate is usually inferred and estimated by measuring the viscosity of a test fluid that is similar to the fracturing fluid without any proppant included. However, as suspended particles (which can be solid, gel, liquid, or bubbles of gas) usually affect the viscosity of a fluid, the actual viscosity of a suspension is usually somewhat different from that of the continuous phase.

Another example of a method of measuring the viscosity of certain fluids that have suspended proppant uses a Proppant Transport Measuring Device ("PTMD"), which is disclosed in U.S. Pat. No. 7,392,842, issued Jul. 1, 2008 and in SPE 115298. The PTMD instrument is preferably calibrated against a more conventional instrument, for example, against a Fann Model 50 viscometer.

Other examples of methods of measuring the viscosity of a fluid include: (1) Tonmukayakul. N. Bryant, J. E. Talbot, M. S, and Morris, J. F., "Dynamic and steady shear properties of reversible cross-linked guar solution and their effects on particle settling behavior", The XVth International Congress on Rheology, Monterey, Calif., 3-8 Aug. 2008. American Institute of Physic Conference Proceedings 1027 ISBN:978-0-7354-0549-3; (2) Tonmukayakul N. Bryant, J. E. and Morris, J. F., "Experimental investigation of the sedimentation behavior of concentrated suspension in non-Newtonian fluids under simple shear flows", 82nd Annual Meeting, The Society of Rheology, Santa Fe, N. Mex., Oct. 24-28, 2010; (3) Tonmukayakul N. and Morris, J. F., "Sedimentation of Particles in Viscoelastic Fluids Under Imposed Shear Conditions," J. Rheol, 2011 (in press); (4) Tonmukayakul, N., Morris, J. E., Prud'homme, R. E. "Method for estimating proppant transport and suspendability of viscoelastic liquids" US Application filed on May 17, 2010, U.S. application Ser. No. 12/722, 493 and it was filed on Mar. 11, 2010; and (5) Tonmukayakul N. and Morris, J. F., "Spreading Front and Particles Alignment in Viscoelastic Fluids," Physical Review E, 2011 (in press).

Foams

A foam is fluid having a liquid external phase that includes a dispersion of undissolved gas bubbles that foam the liquid, usually with the aid of a chemical (a foaming agent) in the liquid phase to achieve stability.

Any suitable gas may be used for foaming, including nitrogen, carbon dioxide, air, or methane. A foamed treatment fluid may be desirable to, among other things, reduce the amount of fluid that is required in a water sensitive subterranean formation, to reduce fluid loss in the formation, and/or to provide enhanced proppant suspension. In examples of such embodiments, the gas may be present in the range of from about 5% to about 98% by volume of the treatment fluid, and more preferably in the range of from about 20% to about 80% by volume of the treatment fluid. The amount of gas to incorporate in the fluid may be affected by many factors including the viscosity of the fluid and the bottom hole temperatures and pressures involved in a particular application. One of ordinary skill in the art, with the benefit of this disclosure, will recognize how much gas, if any, to incorporate into a foamed treatment fluid.

In those embodiments where it is desirable to foam the treatment fluids of the present invention, surfactants such as HY-CLEAN (HC-2) surface-active suspending agent or AQF-2 additive, both commercially available from Halliburton Energy Services, Inc., of Duncan, Okla., may be used. Additional examples of foaming agents that may be used to foam and stabilize the treatment fluids of this invention include, but are not limited to, betaines, amine oxides, methyl ester sulfonates, alkylamidobetaines such as cocoamidopropyl betaine, alpha-olefin sulfonate, trimethyltallowammonium chloride, C8 to C22 alkylethoxylate sulfate and trimethylcocoammonium chloride. Other suitable foaming agents and foam stabilizing agents may be included as well, which will be known to those skilled in the art with the benefit of this disclosure.

Emulsions

An emulsion is a fluid including a dispersion of immiscible liquid particles in an external liquid phase. In addition, the proportion of the external and internal phases is above the solubility of either in the other. A chemical (an emulsifier or emulsifying agent) can be included to reduce the interfacial tension between the two immiscible liquids to help with stability against coalescing of the internal liquid phase.

An emulsion can be an oil-in-water (o/w) type or water-in-oil (w/o) type. A water-in-oil emulsion is sometimes referred to as an invert emulsion. In the context of an emulsion, the "water" phase refers to water or an aqueous solution and the "oil" phase refers to any non-polar organic liquid, such as petroleum, kerosene, or synthetic oil.

It should be understood that multiple emulsions are possible, which are sometimes referred to as nested emulsions. Multiple emulsions are complex polydispersed systems where both oil-in-water and water-in-oil emulsions exist simultaneously in the fluid, wherein the oil-in-water emulsion is stabilized by a lipophilic surfactant and the water-in-oil emulsion is stabilized by a hydrophilic surfactant. These include water-in-oil-in-water (w/o/w) and oil-in-water-in-oil (o/w/o) type multiple emulsions. Even more complex polydispersed systems are possible. Multiple emulsions can be formed, for example, by dispersing a water-in-oil emulsion in water or an aqueous solution, or by dispersing an oil-in-water emulsion in oil.

Classification of Fluids or Gels: Water-Based or Oil-Based

As used herein, "water-based" regarding a fluid or gel means that water or an aqueous solution is the dominant material by weight of the continuous phase of the substance. In contrast, "oil-based" means that oil is the dominant material by weight of the continuous phase of the substance as a whole.

SUMMARY OF THE INVENTION

Methods of increasing the fracture complexity in a treatment zone of a subterranean formation are provided. The subterranean formation is characterized by having a matrix permeability less than 1.0 microDarcy.

According to an embodiment of the invention, methods include the step of pumping one or more fracturing fluids into a far-field region of a treatment zone of the subterranean formation at a rate and pressure above the fracture pressure of the treatment zone. A first fracturing fluid of the one or more fracturing fluids comprises a first solid particulate, wherein: (a) the first solid particulate comprises a first particle size range effective for bridging the pore throats of a proppant pack previously formed or to be formed in the far-field region of the treatment zone; (b) the first solid particulate is in an insufficient amount in the first fracturing fluid to increase the packed volume fraction of any region of the proppant pack to greater than 73%; and (c) the first solid particulate comprises a degradable material.

According to another embodiment of the invention, methods include the step of pumping two or more fracturing fluids into the treatment zone at a rate and pressure above the fracture pressure of the treatment zone for a total pumping volume greater than 2 wellbore volumes, wherein: (a) a first fracturing fluid of the two or more fracturing fluids is pumped into the treatment zone at least before the last 2 wellbore volumes of the total pumping volume, wherein the first fracturing fluid comprises a proppant, wherein the first fracturing fluid does not include a first solid particulate; and (b) a second fracturing fluid of the two or more fracturing fluids is pumped into the treatment zone after the first fracturing fluid is pumped into the treatment zone but at least before the last 2 wellbore volumes of the total pumping volume, wherein the second fracturing fluid comprises the first solid particulate. The first solid particulate comprises a first particle size range effective for bridging the pore throats of a proppant pack formed in the treatment zone by the proppant of the first fracturing fluid, and the first solid particulate is degradable.

According to another embodiment of the invention for use in a remedial application, methods include the step of pumping one or more fracturing fluids into a far-field region of the treatment zone of the subterranean formation at a rate and pressure above the fracture pressure of the treatment zone. A first fracturing fluid of the one or more fracturing fluids comprises a first solid particulate, wherein: (a) the first solid particulate comprises a first particle size range effective for bridging the pore throats of a proppant pack previously formed in the far-field region of the treatment zone; and (b) the first solid particulate comprises a degradable material.

As will be appreciated by a person of skill in the art, the methods according to the invention can have application in various kinds operations involved in the production of oil and gas, including drilling, completion, and intervention.

The features and advantages of the present invention will be apparent to those skilled in the art. While numerous changes may be made by those skilled in the art, such changes are within the spirit of the invention.

BRIEF DESCRIPTION OF THE DRAWING

The accompanying drawing is incorporated into the specification to help illustrate examples according to the presently most-preferred embodiment of the invention.

DETAILED DESCRIPTION OF PRESENTLY PREFERRED EMBODIMENTS AND BEST MODE

General Definitions and Usages

Figure 1:
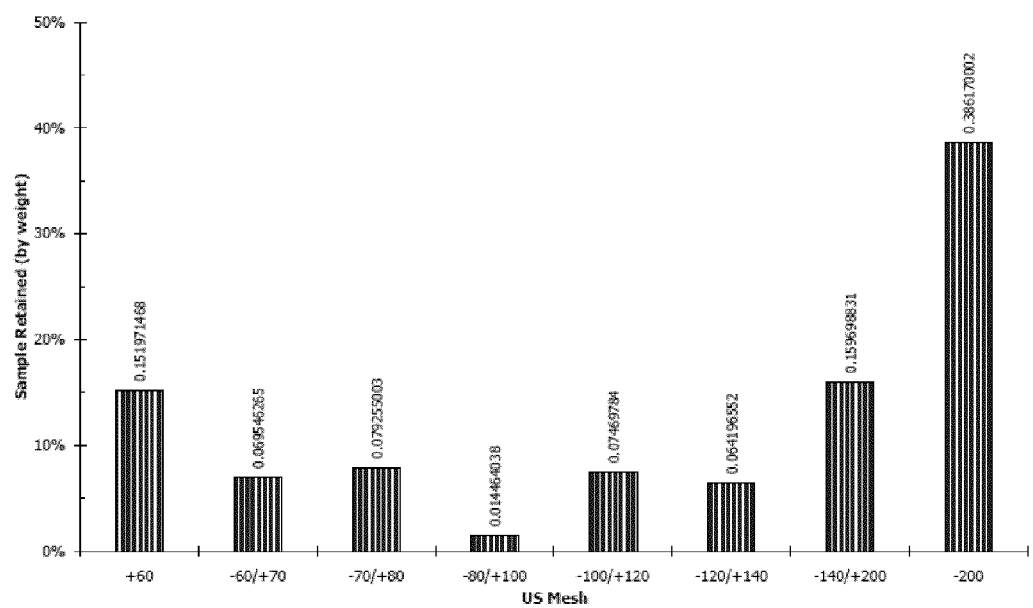
FIG. 1 is a bar chart of the particle size distribution for an example of a solid particulate having particle sizes all less than 50 U.S. Mesh, which particulate is suitable for use in bridging the pore throats of a proppant pack formed of 100 U.S. Standard Mesh size proppant. More than 50% by weight of the particulate has a particle size distribution of −50/+200 U.S. Mesh. This particulate includes a tail-end size range of the particulate having particles sizes less than 200 U.S. Standard mesh. The particulate size distributions were determined by graded screening.

As used herein, the words "comprise," "have," "include," and all grammatical variations thereof are each intended to have an open, non-limiting meaning that does not exclude additional elements or steps.

As used herein, if not otherwise specifically stated, the physical state of a substance (or mixture of substances) and other physical properties are determined at a temperature of 77° F. (25° C.) and a pressure of 1 atmosphere (Standard Laboratory Conditions) under no shear.

As used herein, if not otherwise specifically stated, a material is considered to be "soluble" in a liquid if at least 10 grams of the material can be dissolved in one liter of the liquid when tested at 77° F. and 1 atmosphere pressure for 2 hours and considered to be "insoluble" if less soluble than this. In addition, as used. herein, a material is "dissolvable" if itself or its hydrated product or products is or are "soluble," As will be appreciated by a person of skill in the art, the solubility in water of a certain material may be dependent on the salinity, pH, or other additives in the water. Accordingly, the salinity, pH, additive selection of the water can be modified to facilitate the solubility in aqueous solution.

Unless otherwise specified, any ratio or percentage means by weight.

As used herein, the phrase "by weight of the water" means the weight of the water of the continuous phase of the fluid as a whole without the weight of any proppant, viscosity-increasing agent, dissolved salt, or other materials or additives that may be present in the water.

Unless otherwise specified, any doubt regarding whether units are in U.S. or Imperial units, where there is any difference U.S. units are intended herein. For example, "gal/Mgal" means U.S. gallons per thousand U.S. gallons.

The micrometer (μm) may sometimes referred to herein as a micron.

As used herein, "first," "second," or "third" may be arbitrarily assigned and are merely intended to differentiate between two or more fluids, aqueous solutions, etc., as the case may be, that may be used according to the invention. Accordingly, it is to be understood that the mere use of the term "first" does not require that there be any "second," and the mere use of the word "second" does not require that there by any "third," etc. Further, it is to be understood that the mere use of the term "first" does not require that the element or step be the very first in any sequence, merely that it is at least one of the elements or steps. Similarly, the mere use of the terms "first" and "second" does not necessarily require any sequence. Accordingly, the mere use of such terms does not exclude intervening elements or steps between the "first" and "second" elements or steps, etc.

Unless otherwise specified, as used herein, the apparent viscosity of a fluid (excluding any solid particulate) is measured with a Fann Model 50 type viscometer at a shear rate of 40 l/s and at 77° F. (25° C.) and a pressure of 1 atmosphere. For reference, the viscosity of pure water is about 1 cP. As used herein, a material is considered to be a pumpable fluid if it has an apparent viscosity less than 5,000 cP.

Unless otherwise specified, "about" regarding a number or measurement means within 10% of the number or measurement.

Ultra-Low Permeability Formations

In general, the present invention is directed to increasing fracture complexity in ultra-low permeable formations such as a shale reservoir (which is sometimes referred to in the art as a shale play). As used herein, an ultra-low permeable formation has a matrix permeability less than about 1 micro-Darcy.

Fracture Complexity

Ultra-low permeable formations tend to have a naturally occurring network of multiple interconnected micro sized fractures. In addition, ultra-low permeable formations can be fractured to create or increase the complexity of such multiple interconnected fractures. The fracture complexity is sometimes referred to in the art as a fracture network.

Fracturing Ultra-Low Permeable Formations

Ultra-low permeable formations are usually fractured with water-based fluids having little viscosity and suspending relatively low concentrations of proppant. The size of the proppant is sized to be appropriate for the fracture complexity of such a formation, which is much smaller than used for fracturing higher permeability formations such as sandstone or even tight gas reservoirs. These kinds of fracturing treatments are sometimes referred to as water-frac or slic-frac. The overall purpose is to increase or enhance the fracture complexity of such a formation to allow the gas to be produced.

Although the fractures of the fracture network are very small compared to fractures formed in higher permeability formations, they should still be propped open. According to the invention, it is desirable to temporarily plug the proppant pack in the fracture complexity to force additional fracturing fluid to increase the fracture complexity. After increasing the fracture complexity, it is desirable to re-open the proppant pack to allow the production of hydrocarbon from all the fracture complexity in the zone.

Matrix Permeability

As used herein, "matrix permeability" refers to the permeability of the matrix of the formation regardless of the fractures or microfractures of any major fractures or fracture network. Methods of measuring matrix permeability are known in the art. For example, one reference discloses: "Three laboratory methods were developed to measure matrix gas permeability (Km) of Devonian shale cores and drill cuttings at native water saturations. The first method uses pulse pressure testing of core plugs with helium. The second, new method uses pulse pressure testing of core chips or drill cuttings with helium. These methods gave comparable results on 23 companion shale samples from two wells, with Km=0.2 to $19 \times 10^{-8}$ md. The third, new method uses degassibility of core plugs with helium and methane, and yielded Km higher by a factor of 3 to 10. Most of the core plugs tested showed multiple microfractures that remain open at reservoir stress, and these dominate conventional flow tests. These microfractures are parallel to bedding, are coring induced, and are not present in the reservoir. Knowledge of Km is important in computer simulation modeling of long-term Devonian shale gas production, and has been a key to understanding the nature of the natural fracture network present in the reservoir." "Matrix Permeability Measurement of Gas Productive Shales"; D. L. Luffel, ResTech Houston; C. W. Hopkins, S. A. Holditch & Assocs. Inc.; and P. D. Schettler Jr., Juniata College; SPE 26633.

Stimulated Rock Volume

Stimulated rock volume is a term used in the art regarding the fracturing of shale or other ultra-low permeability reservoirs. "Ultra-low permeability shale reservoirs require a large fracture network to maximize well performance. Microseismic fracture mapping has shown that large fracture networks can be generated in many shale reservoirs. In conventional reservoirs and tight gas sands, single-plane fracture half-length and conductivity are the key drivers for stimulation performance. In shale reservoirs, where complex network structures in multiple planes are created, the concept of a single fracture half-length and conductivity are insufficient to describe stimulation performance. This is the reason for the concept of using stimulated reservoir volume as a correlation parameter for well performance. The size of the created fracture network can be approximated as the 3-D volume (Stimulated Reservoir Volume or SRV) of the microseismic event cloud." Title: "What is Stimulated Rock Volume?" Authors: M. J. Mayerhofer, E. P. Lolon, N. R. Warpinski, C. L. Cipolla, and D. Walser, Pinnacle Technologies, and C. M. Rightmire, Forrest A. Garb and Associates. Source: Society of Petroleum Engineers, "SPE Shale Gas Production Conference, 16-18 Nov. 2008, Fort Worth, Tex., USA." SPE 119890.

Desired Objectives of the Invention

Preferably, the degradable solid particulate is selected to be effective for reducing the permeability of the proppant pack in the fracture complexity of the treatment zone of an ultra-low permeable subterranean formation. The purpose is to cause the proppant pack to have a lower flow capacity than unplugged small fractures and lower than a proppant filled fracture, which causing an increase in fracture complexity rather than extending fracture planes during the fracturing stage. This favors increasing the fracture complexity beyond the near-wellbore region of the treatment zone. The creation of increasing complexity is preferably confirmed with microseismic techniques as known and being currently further developed in the art. The penetration is desired to extend deeper into the zone than in the near well-bore region.

As used herein, the far-field region of a zone is considered the matrix of rock that is at least 5 feet from the wellbore. More preferably, the methods according to the invention penetrate into the matrix of rock at least 10 feet from the wellbore. In some embodiments, over 50 feet from the wellbore is preferred.

The purpose of this invention is not diversion of fracturing fluids between treatment zones. In addition, the purpose of this invention is not to use the degradable particulate to bridge or obstruct pore throats in smaller fractures that may be perpendicular to the one or more dominant fractures being formed in the formation. Moreover, the purpose of this invention is not low damage of the formation. Rather, a purpose of the present inventions is to select a particulate to bridge pore throats of a proppant pack in an ultra-low permeable formation, and, thereby, increase fracture complexity in the ultra-low permeable formation. It is not to enhance large, dominant fractures but to increase fracture complexity of small or micro fractures from which point the hydrocarbons may flow to the well bore and then to the surface, where they may be produced.

Method Embodiments

In general, according to an embodiment of the invention, A method of increasing the fracture complexity in a treatment zone of a subterranean formation is provided. The subterranean formation is characterized by having a matrix permeability less than 1.0 microDarcy. The method includes the step of pumping one or more fracturing fluids into a far-field region of a treatment zone of the subterranean formation at a rate and pressure above the fracture pressure of the treatment zone. A first fracturing fluid of the one or more fracturing fluids includes a first solid particulate, wherein: (a) the first solid particulate includes a particle size distribution for bridging the pore throats of a proppant pack previously formed or to be formed in the treatment zone; and (b) the first solid particulate comprises a degradable material.

Preferably, the first solid particulate is in an insufficient amount in the first fracturing fluid to increase the packed volume fraction of any region of the proppant pack to greater than 73%.

Preferably, the first solid particulate is in at least a sufficient amount in the first fracturing fluid to reduce the permeability of at least a region of the proppant pack at least 50%.

More preferably, the entirety of each of the particles of the first solid particulate is made of one or more degradable materials.

Step of Identifying a Subterranean Formation

The methods preferably include the step of identifying a subterranean formation characterized by having a matrix permeability less than 1.0 microDarcy. More particularly, the step of identifying includes identifying a subterranean formation additionally characterized by having a matrix permeability greater than 0.001 microDarcy (equivalent to 1 nanoDarcy).

Preferably, the step of identifying includes identifying a subterranean formation characterized by having a hydrocarbon content that is sufficient for economic recovery. More preferably, the step of identifying includes identifying a subterranean formation additionally characterized by having a hydrocarbon content greater than 2% by volume gas filled porosity.

Preferably, the step of identifying includes identifying a subterranean formation additionally characterized as being shale.

Step of Designing a Fracturing Stage

The methods preferably include the step of designing or determining a fracturing stage for a treatment zone of the subterranean formation, prior to performing the fracturing stage.

According to an embodiment, the step of designing can include the steps of: (i) determining the total designed pumping volume of the one or more fracturing fluids to be pumped into the treatment zone at a rate and pressure above the fracture pressure of the treatment zone; (ii) determining the size of a proppant of a proppant pack previously formed or to be formed in fractures in the treatment zone at any time before the last 2 wellbore volumes of the total designed pumping volume of the fracturing stage; (iii) determining the size of a first solid particulate for bridging the pore throats of the proppant pack, wherein the first solid particulate comprises a degradable material. More preferably, the entire particulate is made of one or more degradable materials.

According to another embodiment, the step of designing or determining can include the steps of: (i) determining the total designed pumping time for the pumping of one or more fracturing fluids into the treatment zone at a rate and pressure above the fracture pressure of the treatment zone; (ii) determining the size of a proppant of a proppant pack previously formed or to be formed in fractures in the treatment zone at any time before the last 10 minutes of the total designed pumping time of the fracturing stage; (iii) determining the size of a first solid particulate for bridging the pore throats of the proppant pack, wherein the first solid particulate comprises a degradable material. It should be understood that the pumping time is based on a pumping rate that is at least 20% of the pumping rate before diversion to another fracturing stage or, in the case of the final fracturing stage of a multi-stage fracturing job, the pumping rate before the end of the final fracturing stage. In the unusual case of a fracturing job having only a single treatment zone, fracturing of the single treatment zone fracturing would be considered the final fracturing stage. More preferably, the entire particulate is made of one or more degradable materials.

Preferably, the step of designing or determining can additionally include one or more of the steps of: (1) selecting a fracturing fluid, including its composition and rheological characteristics; (2) selecting the pH of the fracturing fluid, if water-based; (3) the design temperature; and (4) the loading of any proppant in the fracturing fluid. As used herein the term "design temperature" refers to an estimate or measurement of the actual temperature at the down hole environment at the time of the treatment. That is, design temperature takes into account not only the bottom hole static temperature ("BHST"), but also the effect of the temperature of the treatment fluid on the BHST during treatment. Because treatment fluids may be considerably cooler than BHST, the difference between the two temperatures can be quite large. Ultimately, if left undisturbed, a subterranean formation will return to the BHST.

In a method according to the inventions that includes the step of planning or determining the fracturing stage, the methods then include a step of performing the fracturing stage according to the planned or determined fracturing stage. For example, for example, the fracturing stage can include, after or during the time the proppant pack is formed or to be formed in the treatment zone but at least before the last 2 wellbore volumes of the total pumping volume, pumping a first fracturing fluid comprising the first solid particulate into the treatment zone at a rate and pressure above the fracture pressure of the treatment zone. Or, for example, the fracturing stage can include, after or during the time the proppant pack is formed or to be formed in the treatment zone but at least before the last 10 minutes of the total pumping time, pumping a first fracturing fluid comprising the first solid particulate into the treatment zone at a rate and pressure above the fracture pressure of the treatment zone.

Step of Performing a Fracturing Stage

In general, a fracturing stage according to the invention preferably includes pumping the one or more fracturing fluids into the treatment zone at a rate and pressure above the fracture pressure of the treatment zone for a total pumping time longer than 30 minutes. A fracturing fluid including the first solid particulate should be included as part of the one or more fracturing fluids before the tail end of the fracturing stage. It should be understood that the objective of the fracturing fluid with the first solid particulate and the extended pumping time is to increase the fracture complexity far field in a zone and to increase the stimulated fracture volume. Accordingly, the duration of fracturing of a treatment zone can be much longer than 30 minutes or the total pumping volume of the one or more fracturing fluids can be much higher than conventionally used in conventional reservoirs.

Fracturing Fluids

Preferably, the fracturing fluids for use in fracturing ultra-low permeability formations according to the methods of the invention are water-based. One of the reasons for this is the large volumes required, and water is relatively low cost compared to oil-based fluids. Other reasons can include concern for damaging the reservoir and environmental concerns.

A fracturing stage can include the step of pumping one or more fracturing fluids into a far-field region of a treatment zone. According to an embodiment, the first fracturing fluid is the only fracturing fluid used in a fracturing stage. According to a more preferred embodiment, more than one fracturing fluid is used in the same fracturing stage.

Slick Water Fracturing for Ultra-Low Permeability Formation

According to the invention, a friction-reducing polymer can be included in the treatment fluids, for example, in an amount equal to or less than 0.2% by weight of the water present in the treatment fluid. Preferably, any friction-reducing polymers are included in a concentration sufficient to reduce friction without gel formation upon mixing. By way of example, the treatment fluid comprising the friction-reducing polymer would not exhibit an apparent yield point. While the addition of a friction-reducing polymer may minimally increase the viscosity of the treatment fluids, the polymers are not included in the treatment fluids of the present invention in an amount sufficient to substantially increase the viscosity. For example, if proppant is included in the treatments fluid, velocity rather than fluid viscosity generally may be relied on for proppant transport. In some embodiments, the friction-reducing polymer can be present in an amount in the range of from about 0.01% to about 0.15% by weight of the treatment fluid. In some embodiments, the friction-reducing polymer can be present in an amount in the range of from about 0.025% to about 0.1% by weight of the treatment fluid.

Generally, the treatment fluids for use in the invention are not relying on viscosity for proppant transport. Where particulates (e.g., proppant, first solid particulate, etc.) are included in the fracturing fluids, the fluids rely on at least velocity to transport the particulates to the desired location in the formation. In some embodiments, the treatment fluids may have a viscosity up to about 10 centipoise ("cP"). In some embodiments, the treatment fluids may have a viscosity in the range of from about 0.7 cP to about 10 cP. According to a preferred embodiment of the methods, the first fracturing fluid has a viscosity in the range of about 0.7 cP to about 10 cP. According to a more preferred embodiment, all of the one or more fracturing fluids have a viscosity in the range of about 0.7 cP to about 10 cP. For the purposes of this disclosure, viscosities are measured at room temperature using a FANN® Model 35 viscometer at 300 rpm with a 1/5 spring.

The ultra-low matrix permeability of a shale formation does not allow for fracturing fluid damage to the formation or fracturing fluid leak off into the matrix of the formation. In addition, the small proppant sizes used in fracturing to increase the fracture complexity of a subterranean formation having ultra-low matrix permeability require less viscosity to be carried by the fracturing fluid. In addition, a higher viscosity fluid would not be able to appreciably penetrate the permeability of a proppant pack formed with such smaller proppant.

Proppant Pack Formed or to be Formed (E.g., Remedial or Primary Treatment)

In an embodiment, a proppant pack can have been formed in the treatment zone before the fracturing stage of the method. In another embodiment, a proppant pack can be formed during the fracturing stage. If the proppant pack is formed before the fracturing stage, this means that the treatment zone was previously fractured and a proppant pack was previously placed in the fracture complexity. Accordingly, the methods according to the invention can be adapted for remedial or primary fracturing of a treatment zone.

Proppant Pack Formed or to be Formed (E.g., Stepwise within a Fracturing Stage)

In addition, it is contemplated that a proppant pack can be formed during the fracturing stage, either before the introduction of the first solid particulate or simultaneously with the introduction of the first solid particulate. For example, one of the earlier fracturing fluids used in a fracturing stage can include a proppant for forming a proppant pack in the fracture complexity, and one of the later fracturing fluids used in the fracturing stage can include a first solid particulate for increasing the fracture complexity as additional fracturing fluid is pumped into the formation.

Proppant

In an embodiment that includes a fracturing fluid with proppant, the one or more of the fracturing fluids used in the method preferably include in the range of about 1% to about 20% by weight of the proppant. Accordingly, the proppant is in the fracturing fluid at less than about 4 pounds per gallon. More preferably, one or more of the fracturing fluids includes in the range of about 5% to about 10% by weight of the proppant.

For an ultra-low permeable formation, the proppant of a proppant pack formed or to be formed in the fracture complexity preferably has a particulate size range that has an upper end equal to or less than 50 U.S. Standard Mesh. More preferably, the proppant has a graded size range anywhere between −50/+200 U.S. Standard Mesh. Most preferably, the proppant has a graded particle size range anywhere between −70/+140 U.S. Standard Mesh. Typically, the proppant of a proppant pack formed or to be formed in the fracture complexity of an ultra-low permeable formation has a median particle size of about 100 U.S. Standard Mesh.

Bridging of Pore Throats of a Proppant Pack

In the context of a pack of particulate, such as a proppant pack, a certain particulate will have a predictable permeability and pore-throat sizes under a certain packing stress and other conditions. For example, all else being equal, a pack of ideal spheres of uniform size will have a predictable geometric arrangement and pore throat sizes. For such a pack of spheres, a first bridging particulate having ideal spheres of uniform size in a range that is about $1/6^{th}$ to about $1/13^{th}$ of the size of the spheres in the pack will be able to bridge the pore throats and substantially reduce the permeability of the pack. The first bridging particulate will itself have a predictable permeability and pore-throat sizes, but these will be much smaller than that of the pack. A second bridging particulate having a size distribution in the range that is about $1/6^{th}$ to about $1/13^{th}$ of the size of the first bridging particulate would be expected to be able to bridge the pore throats and substantially reduce the permeability of the first bridging particulate. The complexity increases with increasing the particle size distribution of each of the particulates, with changes in the shape of each of the particulates, and with variations in the shape distribution of each of the particulates, but these basic size proportions are useful rules of thumb.

First Solid Particulate

According to a preferred embodiment, the first particle size range has an upper end that is greater than or equal to about $1/13^{th}$ of the median particle size of the proppant (which would be equivalent to about 12 μm for a 100 U.S. Standard Mesh proppant). In addition, the first particle size range has a lower end that is less than or equal to about $1/6^{th}$ of the median size of the proppant (which would be equivalent to about 25 μm or about 500 mesh for a 100 U.S. Standard Mesh proppant). A tail end of smaller or larger particles than the particle sizes of the first solid particulate does not interfere and can be useful according to the invention.

As a practical matter, for use with a 100 mesh median size proppant and according to a presently most preferred embodiment, the first solid particulate includes a first solid particle size range smaller than about 33 μm, which is equivalent to about 400 U.S. Standard mesh.

As discussed above, the first solid particulate preferably is not in the shape of a fiber. Preferably, the particulate has aspect ratios less than 5:1. More preferably, the first solid particulate is substantially globular in shape.

It is to be understood that the proppant would be adequately suspended in a fracturing fluid that is similar to the first fracturing fluid but without the first solid particulate for the similar fracturing fluid to transport the proppant into the treatment zone. In other words, the solid particulate is not needed to help suspend the proppant in the fracturing fluid during transport into the treatment zone.

Preferably, the first solid particulate is in the first fracturing fluid in at least a sufficient amount to reduce the permeability of at least a region of the proppant pack by at least 50%. More preferably, the first solid particulate is in the first fracturing fluid in at least a sufficient amount to reduce the permeability of at least a region of the proppant pack at least 90% in less than 10 minutes under the conditions of pumping the first fracturing fluid into the treatment zone. Furthermore, one skilled in the art would recognize that determining the size distribution of small particles (below about 200 mesh) is time consuming. Therefore, this empirical approach may be utilized to determine if a give particulate containing 200 mesh and below particles has the desired performance without actually measuring the size distribution of the sub-200 mesh particles is a valuable method of determine the suitability of a given particulate.

According to a more preferred embodiment, the first solid particulate remains insoluble and does not otherwise appreciably degrade for at least 2 hours under the conditions of the treatment zone. Preferably, the first solid particulate degrades under the temperature and pressure conditions of the treatment zone at least 50% by weight within 30 days. One skilled in the art would recognize that certain particulates, such as insoluble scale inhibitors, may be tailored to have longer dissolution rates to provide a secondary benefit such as long-term scale inhibition in excess of 30 days.

Second Smaller Solid Particulate or Tail End of First Solid Particulate

According to a further embodiment of the invention, the method optionally includes the step of: determining the size of a second solid particle size range for bridging the pore throats of the first solid particulate. Preferably, first fracturing fluid additionally comprises the second solid particle size range.

In an embodiment, the first solid particulate can include a second particle size range effective for bridging the pore throats of the first solid particulate. In another embodiment, the first fracturing fluid additionally comprises a second solid particulate, wherein the second solid particulate has a second particle size range effective for bridging the pore throats of the first solid particulate.

Preferably, the second solid particle size range is in the first fracturing fluid in at least a sufficient amount to reduce the permeability of at least a region of a pack of the first solid particulate at least 50%. More preferably, the second solid particle size range is in the first fracturing fluid in at least a sufficient amount to reduce the permeability of at least a region of a pack of the first solid particulate at least 90% in less than 10 minutes under the conditions of pumping the first fracturing fluid into the treatment zone.

Theoretical Discussion

An ideal pack of spheres will have pore throats that are about $1/6^{th}$ the diameter of the packed spheres. Such an idealized pack of spheres can represent a pack of proppant particles. The pore volume of a tightly packed proppant bed is about 35% of the total pack volume. This can also be referred to as having a packed volume fraction ("PVF") of about 0.65.

A first solid particulate having a diameter of about $1/6^{th}$ the pore throat will substantially plug the pore throat. A first solid particulate with a diameter of $1/6^{th}$ the proppant particles would have a volume of about 0.46% of the proppant particle (the ratio is $r^3/R^3$ where r=the radius of the first solid particulate and R=the radius of the proppant, the ratio resulting from the ratio of volumes of spheres where the volume of a sphere is 4 Pi $r^3/3$). If one of these particles is needed for each pore throat and there is on average one pore throat per proppant particle, then only a very small fraction of the void volume of a particle pack is needed to be filled with the first solid particulate to get substantial plugging of the pore throats of the proppant pack.

Even if a second particulate of smaller particles are used or needed to bridge on the pore throats of the bridged first solid particulate, the second particulate still need not significantly fill the pore volume. Based on the idealized ratios involved, there will be three of particles of the second particulate needed per first solid particulate. This would add another 0.0064% additional volume to the void space. With the proppant and plugging particulates, the packed volume fraction, in such an idealized case, would be about 0.655. This is consistent with the behavior of natural core where the presence of 2% "fines" (smaller particles that can plug pore throats in a conventional formation) is known to be enough to cause serious damage to the permeability of the conventional formation if they are mobilized. The term "fines" refers to particles that are small enough to become mobile if the right flow conditions are created. Even with this loading of fines, there is still a packed volume fraction of only about 0.67.

For example, according to an embodiment, the method of increasing the fracture complexity of a subterranean formation can include the steps of: (i) pumping a first fracturing fluid of two or more fracturing fluids into the treatment zone at a rate and pressure above the fracture pressure of the treatment zone; (ii) pumping a second fracturing fluid of the two or more fracturing fluids is pumped into the treatment zone after the first fracturing fluid is pumped into the treatment zone wherein the second fracturing fluid comprises a first solid particulate, wherein the first solid particulate has a size for bridging the pore throats of any proppant pack formed in the treatment zone by the proppant of the first fracturing fluid, and wherein the first solid particulate is degradable. It should be appreciated that these steps could be repeated or alternated in the same fracturing zone.

When this is performed there will be regions within the proppant pack that have the solid degradable particulate and regions that do not have any. The packed volume fraction of the regions containing the solid degradable particulate will be below 0.73; furthermore, the regions of the proppant pack without the solid degradable particulate will be well below 0.73 and will approach or be at the native packed volume fraction for the given proppant. In most, if not all instances, the packed volume fraction of the proppant pack as a whole will not appreciably change from its native value. This would also be the case for instances where the particulate is run throughout the proppant stage. The native packed volume fraction for a perfect sphere of one size is on the order of 0.64 to 0.68 depending upon the method used to determine the value (Torquato, S.; Truskett, T. M.; Debenedetti, P. G. Is Random Close Packing of Spheres Well Defined? Phys. Rev. Lett. 2000, 84, 2064 as referenced in Ind. Eng. Chem. Res. 2002, 41, 1122-1128).

Conceptually, the difference between the methods according to this invention and diversion is that diversion occurs at or near the wellbore region. This is best illustrated by taking the hypothetical situation where a zone contains a single perforation. If one performs a near-wellbore diversion, that single perforation would stop taking fluid and since there is not a second perforation to take the fluid, the stage would be complete. According to this invention, one would be able to continue pumping through the single perforation a fluid according to the method of the invention.

Example of First Solid Particulate for Use with a Proppant Pack of 100 U.S. Mesh Proppant An example of a particulate having a suitable particle size distribution for use as the first solid particulate is a particulate formed of a scale inhibitor as described herein.

FIG. 1 is a bar chart of the particle size distribution for the example of a solid particulate having particle sizes all less than 50 U.S. Mesh, which particulate is suitable for use in bridging the pore throats of a proppant pack formed of 100 U.S. Standard Mesh size proppant. More than 50% by weight of the particulate has a particle size distribution of −50/+200 U.S. Mesh. This particulate includes a tail-end size range of the particulate having particles sizes less than 200 U.S. Standard mesh. The particulate size distributions were determined by graded screening.

The particulate size distribution of this example material was also measured using a MASTERSIZER® 2000 particulate analyzer with a 2000S sampler and MASTERSIZER® Software v 5.60. This instrument uses laser light scattering to compute the size of particles with sizes ranging from 0.02 μm to 2000 μm. The amount of scattered light as well as the angle of scattering can be used to determine the size of a particle that is dispersed in either air or liquid. The system is capable of examining solid particulate, emulsions, and suspensions. The instrument settings were:

Sample RI: 1.5 (Actual RI unknown, but most organic materials are ~1.5)
Absorption Value: 0.1
Dispersant: Air
Stir Speed: N/A
Sonication: N/A
Disperser Pressure: 2.0 bar
Feed Rate: 13-18
Measurement Time: 5 s
Calculation Model: General Purpose (Fine)

Figure 2:
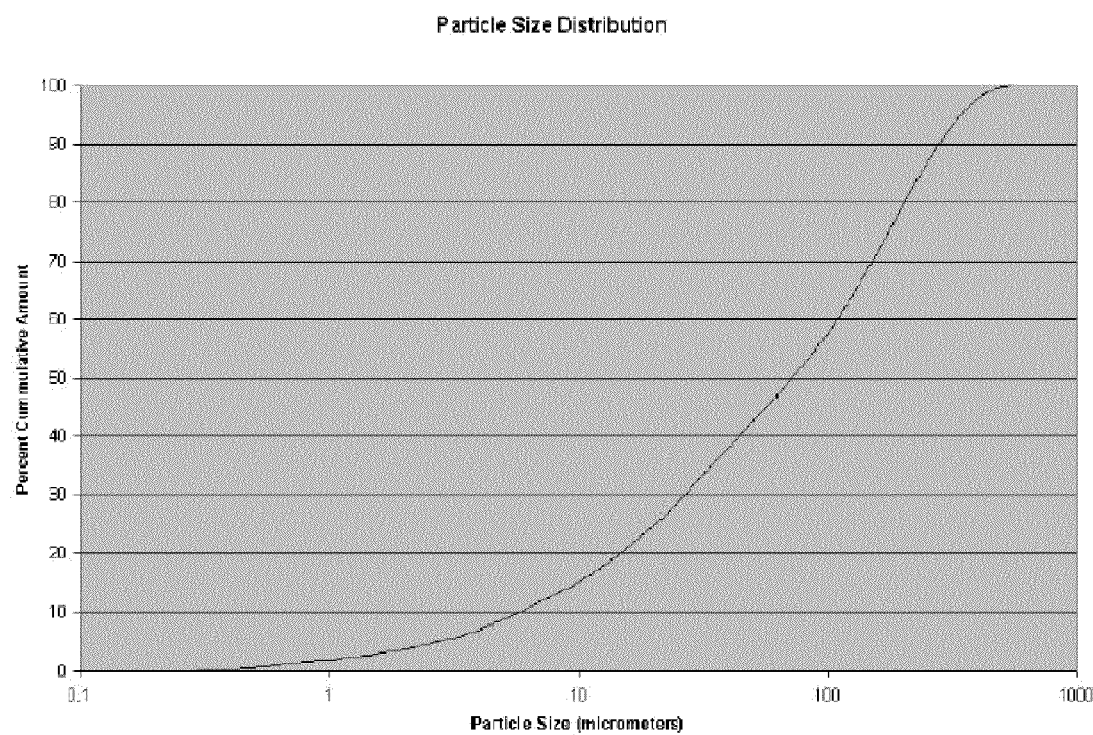
FIG. 2 is a graph of the particle size distribution for the same example material of FIG. 1 but as measured with the MASTERSIZER® instrument for measuring particle size distributions.

FIG. 2 is a graph of the particle size distribution as measured with the MASTERSIZER® instrument. The upper end of the particle size range is about 630 micrometers and the median particle size is about 72.5 micrometers. This measurement is in volume percent, whereas the analysis shown in FIG. 1 is in weight percent.

Figure 3:
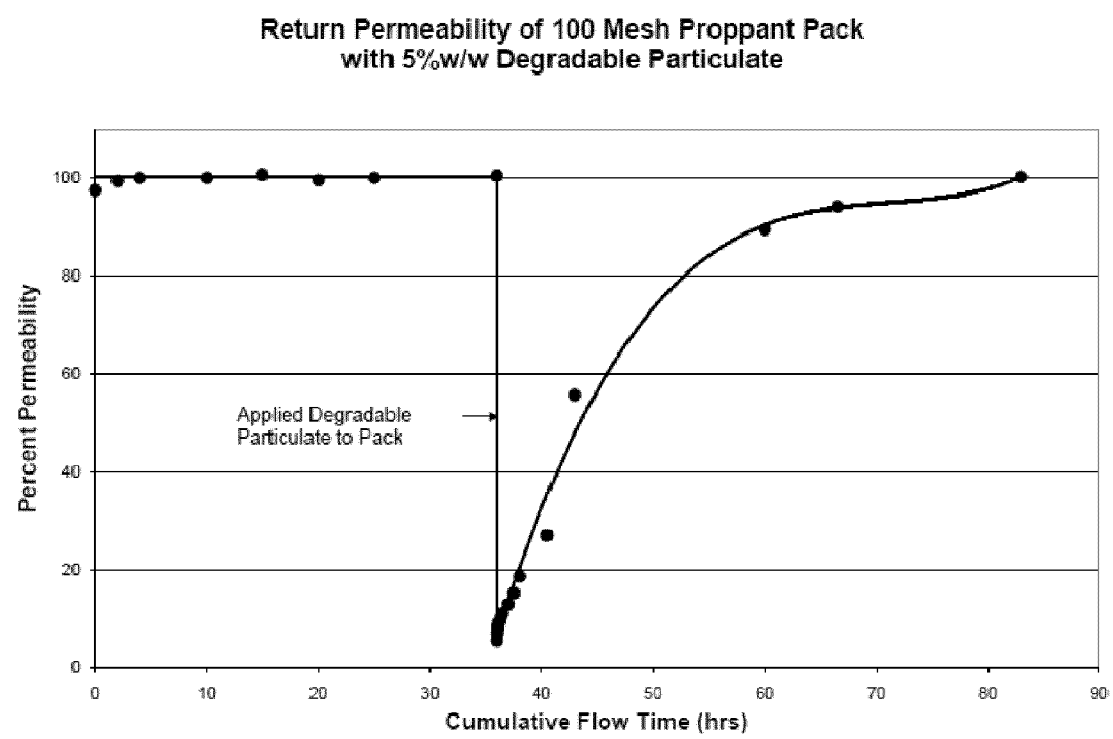
FIG. 3 is a graph of the permeability measurements of a laboratory experiment illustrating the effectiveness of temporary reduction of the permeability of a 100 U.S. Standard Mesh proppant pack with 5% w/w degradable particles having a particle size distributions as shown in FIGS. 1 and 2.
Figure 4:
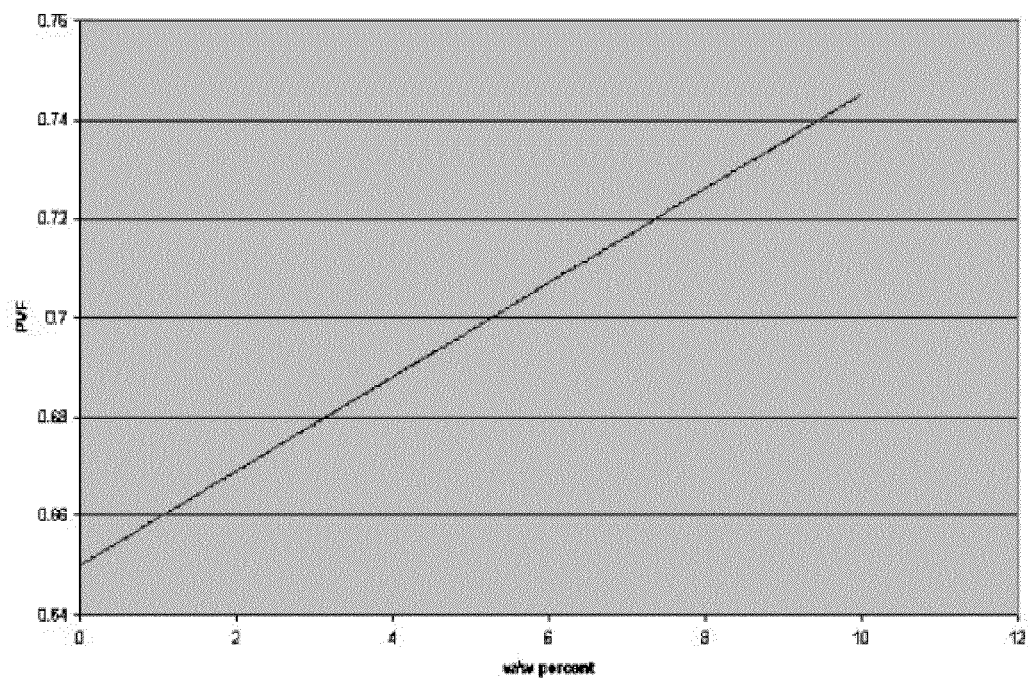
FIG. 4 is a graph of the general relationship between the weight percent of the degradable particles mixed with a 100 U.S. Standard Mesh proppant pack and the packed volume fraction when the mixed particles are packed.

FIG. 3 is a graph of the permeability measurements of a laboratory experiment illustrating the effectiveness of temporary reduction of the permeability of a 100 U.S. Standard Mesh proppant pack with 5% w/w of the example degradable particulate having a particle size distribution as shown in FIGS. 1 and 2. The laboratory procedure was as follows: Pack a flow cell with 100 U.S. Standard Mesh proppant. The cell used had a 1 inch internal diameter and 6 inches in length with a screen on the bottom to retain the 100 mesh proppant. Flow water through the proppant pack at constant pressure to get a baseline flow rate. Repack cell with the 100 mesh proppant mixed with 5% by weight of the degradable particulate relative to the weight of the proppant. In this example, the degradable particulate is a chemical capable of inhibiting scale as described herein. Flow water through proppant pack at constant pressure and measure flow rate with time to determine the permeability. As illustrated in FIG. 3, the permeability of a pack of 100 Mesh proppant with 5% w/w of the degradable particulate is temporarily reduced FIG. 4 is a graph of the general relationship between the weight percent of the degradable particles mixed with a 100 U.S. Standard Mesh proppant pack and the packed volume fraction when the mixed particles are packed. A proppant pack will typically have a packed volume fraction of about 0.65, with a small variation depending on how tightly packed. Adding the degradable particulate increases the packed volume fraction relative to the proppant pack alone. As illustrated in FIG. 3, a 5% wt/wt of the example first solid particulate is more than sufficient to increase the packed volume fraction to about 0.7 and to reduce the permeability of the proppant pack more than 90%. Any additional proportion of the first solid particulate to the proppant beyond that necessary to achieve about a 90% reduction in the proppant pack permeability would be wasted for the purposes of the present inventions.

Preferably, the first solid particulate does not increase the packed volume fraction to more than 0.73. Preferably, the sum total of all solid particulate included in the fracturing fluid does not increase the packed volume fraction of a proppant pack formed or to be formed in the formation to more than 0.73.

Degradable Solid Particulate

The first solid particulate for use in the methods according to the invention is selected to be degradable. Preferably, any second solid particulate is also selected to be degradable, although any second solid particulate is not required to be degradable. As the first solid particulate is degradable, when the first solid particulate degrades any second particulate should be small enough to pass through the pore throats of the proppant pack. The chemical composition of the second solid particulate can be the same or different as the first solid particulate.

As used herein, a degradable material is capable of undergoing an irreversible degradation downhole. The term "irreversible" as used herein means that the degradable material once degraded should not recrystallize or reconsolidate while downhole in the treatment zone, that is, the degradable material should degrade in situ but should not recrystallize or reconsolidate in situ.

The terms "degradable" or "degradation" refer to both the two relatively extreme cases of degradation that the degradable material may undergo, that is, heterogeneous (or bulk erosion) and homogeneous (or surface erosion), and any stage of degradation in between these two.

Preferably, the degradable material of the particulate degrades slowly over time as opposed to instantaneously.

The specific features of the degradable material of a first solid particulate may be modified so as to reduce the permeability of a proppant pack when intact while easing the removal of the degradable material when desirable. Whichever degradable material is utilized, the bridging agents may have any shape, including but not limited to particles having the physical shape of platelets, shavings, flakes, ribbons, rods, strips, spheroids, toroids, pellets, tablets, or any other physical shape. One of ordinary skill in the art with the benefit of this disclosure will recognize the specific degradable material and the preferred size and shape for a given application. Preferably, however, the particulate for use in the methods according to the invention is not fiber shaped. More preferably, the particulate for use in the present invention is globular or generally spherical.

The bridging in the proppant pack formed by a solid particulate comprising a degradable material according to the present invention is preferably "self-degrading." As referred to herein, the term "self-degrading" means bridging may be removed without the need to circulate a separate "clean up" solution or "breaker" into the treatment zone, wherein such clean up solution or breaker having no purpose other than to degrade the bridging in the proppant pack. Though the bridging formed by the methods of the present invention constitute "self-degrading" bridging, an operator may nevertheless elect to circulate a separate clean up solution through the well bore and into the treatment zone under certain circumstances, such as when the operator desires to hasten the rate of degradation of the bridging in the proppant pack. In certain embodiments, the particulate of the present invention is sufficiently acid-degradable as to be removed by such treatment.

The degradation can be a result of, inter alia, a chemical or thermal reaction or a reaction induced by radiation. The degradable particulate is preferably selected to degrade by at least one mechanism selected from the group consisting of: hydrolysis, hydration followed by dissolution, dissolution, decomposition, or sublimation.

The choice of degradable material for use in the degradable particulate can depend, at least in part, on the conditions of the well, e.g., wellbore temperature. For instance, lactides can be suitable for lower temperature wells, including those within the range of about 60° F. to about 150° F., and polylactides can be suitable for well bore temperatures above this range. Dehydrated salts may also be suitable for higher temperature wells.

In general, selection of a degradable particulate and fracturing fluid depends on a number of factors including: (1) the degradability of the material of the particulate; (2) the particle size of the particulate; (3) the pH of the fracturing fluid, if water-based; (4) the design temperature; and (5) the loading of degradable particulate in the fracturing fluid. The step of designing or determining a fracturing stage preferably includes selecting a suitable degradable particulate and fracturing fluid for the fracturing stage.

In choosing the appropriate degradable material, the degradation products that will result should also be considered. For example, the degradation products should not adversely affect other operations or components in the well. As an example of this consideration, a boric acid derivative may not be included as a degradable material in the fracturing fluids of the present invention where such fluids utilize xanthan as the viscosifier, because boric acid and xanthan are generally incompatible. One of ordinary skill in the art, with the benefit of this disclosure, will be able to recognize when potential components of the fracturing fluids of the present invention would be incompatible or would produce degradation products that would adversely affect other operations or components.

It is to be understood that a particulate can include mixtures of two or more different degradable compounds.

Degradable Polymers

As for degradable polymers, a polymer is considered to be "degradable" herein if the degradation is due to, inter alia, chemical or radical process such as hydrolysis, oxidation, enzymatic degradation, or UV radiation. The degradability of a polymer depends at least in part on its backbone structure. For instance, the presence of hydrolyzable or oxidizable linkages in the backbone often yields a material that will degrade as described herein. The rates at which such polymers degrade are dependent on the type of repetitive unit, composition, sequence, length, molecular geometry, molecular weight, morphology (e.g., crystallinity, size of spherulites, and orientation), hydrophilicity, hydrophobicity, surface area, and additives. Also, the environment to which the polymer is subjected may affect how the polymer degrades, e.g., temperature, presence of moisture, oxygen, microorganisms, enzymes, pH, and the like.

Some examples of degradable polymers are disclosed in U.S. Patent Publication No. 2010/0267591, having for named inventors Bradley L. Todd and Trinidad Munoz, which is incorporated herein by reference, discloses some suitable chemical compositions that can be sized for particulate materials for use in methods according to the present invention.

Suitable examples of degradable polymers that may be used in accordance with the present invention include but are not limited to those described in the publication of Advances in Polymer Science, Vol. 157 entitled "Degradable Aliphatic Polyesters" edited by A.-C. Albertsson and the publication "Biopolymers" Vols. 1-10, especially Vol. 3b, Polyester II: Properties and Chemical Synthesis and Vol. 4, Polyester III: Application and Commercial Products edited by Alexander Steinbuchel, Wiley-VCM.

Non-limiting examples of degradable materials that may be used in conjunction with the present invention include, but are not limited to aromatic polyesters and aliphatic polyesters. Such polyesters may be linear, graft, branched, crosslinked, block, dendritic, homopolymers, random, block, and star- and hyper-branched aliphatic polyesters, etc.

Some suitable polymers include poly(hydroxy alkanoate) (PHA); poly(alpha-hydroxy) acids such as polylactic acid (PLA), polygylcolic acid (PGA), polylactide, and polyglycolide; poly(beta-hydroxy alkanoates) such as poly(beta-hydroxy butyrate) (PHB) and poly(beta-hydroxybutyrates-co-beta-hydroxyvelerate) (PHBV); poly(omega-hydroxy alkanoates) such as poly(beta-propiolactone) (PPL) and poly(ε-caprolactone) (PCL); poly(alkylene dicarboxylates) such as poly(ethylene succinate) (PES), poly(butylene succinate) (PBS); and poly(butylene succinate-co-butylene adipate); polyanhydrides such as poly(adipic anhydride); poly(orthoesters); polycarbonates such as poly(trimethylene carbonate); and poly(dioxepan-2-one)]; aliphatic polyesters; poly(lactides); poly(glycolides); poly(ε-caprolactones); poly(hydroxybutyrates); poly(anhydrides); aliphatic polycarbonates; poly(orthoesters); poly(amino acids); poly(ethylene oxides); and polyphosphazenes. Of these suitable polymers, aliphatic polyesters and polyanhydrides are preferred. Derivatives of the above materials may also be suitable, in particular, derivatives that have added functional groups that may help control degradation rates.

Aliphatic polyesters degrade chemically, inter alia, by hydrolytic cleavage. Hydrolysis can be catalyzed by acids, bases, enzymes, or metal salt catalyst solutions. Generally, during the hydrolysis, carboxylic end groups are formed during chain scission, and this may enhance the rate of further hydrolysis. This mechanism is known in the art as "autocatalysis," and is thought to make polyester matrices more bulk eroding. Suitable aliphatic polyesters have the general formula of repeating units shown below:

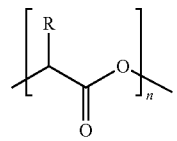

Formula I where n is an integer above 75 and more preferably between 75 and 10,000 and R is selected from the group consisting of hydrogen, alkyl, aryl, alkylaryl, acetyl, heteroatoms, and mixtures thereof.

Of the suitable aliphatic polyesters, poly(lactide) is preferred. Poly(lactide) is synthesized either from lactic acid by a condensation reaction or more commonly by ring-opening polymerization of cyclic lactide monomer. Since both lactic acid and lactide can achieve the same repeating unit, the general term poly(lactic acid) as used herein refers to formula I without any limitation as to how the polymer was made such as from lactides, lactic acid, or oligomers, and without reference to the degree of polymerization or level of plasticization.

The lactide monomer exists generally in three different forms: two stereoisomers L- and D-lactide and racemic D,L-lactide (meso-lactide). The oligomers of lactic acid and oligomers of lactide are defined by the formula:

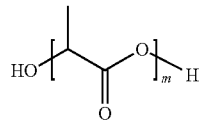

Formula II where m is an integer 2≤m≤75. Preferably m is an integer and 2≤m≤10. These limits correspond to number average molecular weights below about 5,400 and below about 720, respectively. The chirality of the lactide units provides a means to adjust, inter alia, degradation rates, as well as physical and mechanical properties. Poly(L-lactide), for instance, is a semicrystalline polymer with a relatively slow hydrolysis rate. This could be desirable in applications of the present invention where a slower degradation of the degradable material is desired. Poly(D,L-lactide) may be a more amorphous polymer with a resultant faster hydrolysis rate. This may be suitable for other applications where a more rapid degradation may be appropriate. The stereoisomers of lactic acid may be used individually or combined to be used in accordance with the present invention. Additionally, they may be copolymerized with, for example, glycolide or other monomers like ε-caprolactone, 1,5-dioxepan-2-one, trimethylene carbonate, or other suitable monomers to obtain polymers with different properties or degradation times. Additionally, the lactic acid stereoisomers can be modified to be used in the present invention by, inter alia, blending, copolymerizing or otherwise mixing the stereoisomers, blending, copolymerizing or otherwise mixing high and low molecular weight polylactides, or by blending, copolymerizing or otherwise mixing a polylactide with another polyester or polyesters. See U.S. application Publication Nos. 2005/0205265 and 2006/0065397, incorporated herein by reference. One skilled in the art would recognize the utility of oligomers of other organic acids that are polyesters.

For the purposes of forming a suitable solid particulate, the polymer (or oligomer) should have at least a sufficient degree of polymerization or level of plasticization to be a solid.

Polycondensation reactions, ring-opening polymerizations, free radical polymerizations, anionic polymerizations, carbocationic polymerizations, coordinative ring-opening polymerization, and any other suitable process may prepare such suitable polymers.

Degradable Anionic Compounds that can Bind a Multi-Valent Metal

Certain anionic compounds that can bind a multi-valent metal are degradable. More preferably, the anionic compound is capable of binding with any one of the following: Calcium, magnesium, iron, lead, barium, strontium, titanium, zinc, and/or zirconium. One skilled in the art would recognize that proper conditions (such as pH) may be required for this to take place.

Examples of anionic compounds that can bind with a multi-valent metal include scale inhibiting chemicals and chelating chemicals. Examples of suitable scale-inhibiting and chelating chemicals are disclosed in U.S. application Ser. No. 12/512,232 filed on Jul. 30, 2009, entitled "Methods of Fluid Loss Control and Fluid Diversion in Subterranean Formations," incorporated herein by reference.

According to a presently preferred embodiment of a particulate comprising an anionic compound, the first solid particulate comprises a scale inhibitor. In general, suitable scale inhibitors for use in the present invention may be any scale inhibitor in particulate form that is insoluble in water. Suitable scale inhibitors generally include, but are not limited to, bis(hexamethylene triamine penta (methylene phosphonic acid)); diethylene triamine penta (methylene phosphonic acid); ethylene diamine tetra(methylene phosphonic acid); hexamethylenediamine tetra(methylene phosphonic acid); 1-hydroxy ethylidene-1,1-diphosphonic acid; 2-hydroxyphosphonocarboxylic acid; 2-phosphonobutane-1,2,4-tricarboxylic acid; phosphino carboxylic acid; diglycol amine phosphonate; aminotris(methanephosphonic acid); methylene phosphonates; phosphonic acids; aminoalkylene phosphonic acids; aminoalkyl phosphonic acids; polyphosphates, salts thereof (such as but not limited to: sodium, potassium, calcium, magnesium, ammonium); and combinations thereof. As an added benefit, these types of particulate have scale-inhibiting properties, wherein the particulate releases the scale inhibitor over time.

In some embodiments, the particulate comprises a chelating agent, wherein the chelating agent is insoluble in water. The chelating agents useful in the present invention may be any suitable chelating agent in particulate form that is insoluble in water. Suitable chelating agents generally include, but are not limited to, the acidic forms of the following: ethylenediaminetetraacetic acid (EDTA), hydroxyethyl ethylenediamine triacetic acid (HEDTA), nitrilotriacetic acid (NTA), diethylene triamine pentaacetic acid (DTPA), glutamic acid diacetic acid (GLDA), glucoheptonic acid (CSA), propylene diamine tetraacetic acid (PDTA), ethylenediaminedisuccinic acid (EDDS), diethanolglycine (DEG), ethanoldiglycine (EDG), glucoheptonate, citric acid, malic acid, phosphates, amines, citrates, derivatives thereof, and combinations thereof. Other suitable chelating agents may include the acidic forms of chelating agents classified as polyphosphates (such as sodium tripolyphosphate and hexametaphosphoric acid), aminocarboxylic acids (such as N-dihydroxyethylglycine), aminopolycarboxylates, 1,3-diketones (such as acetylacetone, trifluoroacetylacetone, and thenoyltrifluoroacetone), hydroxycarboxylic acids (such as tartaric acid, gluconic acid and 5-sulfosalicylic acid), polyamines (such as ethylenediamine, dethylentriamine, treithylenetetramine, and triaminotriethylamine), aminoalcohols (such as triethanolamine, N-hydroxyethylethylenediamine), aromatic heterocyclic bases (such as dipyridyl and o-phenanthroline), phenols (such as salicylaldehyde, disulfopyrocatechol, and chromotropic acid), aminophenols (such as oxine and 8-hydroxyquinoline), oximes (such as oxinesulfonic acid, dimethylglyoxime, and salicylaldoxime), Schiff bases (such as disaliclaldehyde 1,2-propylenediimine), tetrapyrroles (such as tetraphenylporphine and phthalocyanine), sulfur compounds (such as toluenedithiol, dimercaptopropanol, thioglycolic acid, potassium ethyl xanthate, sodium diethyldithiocarbamate, dithizone, diethyl dithiophosphoric acid, and thiourea), synthetic macrocyclic compounds (such as dibenzo-[18]-crown-6, and hexamethyl-[14]-4,11 dieneN$_4$ (2.2.2-cryptate), polymers (such as polyethoeneimines, polymethacryloylacetone, poly(p-vinylbenzyliminodiacetic acid), phosphonic acids (such as nitrilotrimethylenephosphonic acid, ethylenediaminetetra(methylenephosphonic acid) and hydroxyethylidenediphosphonic acid), derivatives thereof, and combinations thereof.

In general, particulates comprising a scale inhibitor or a chelating agent suitable for use in the present invention are insoluble in water, but are substantially soluble when contacted with a solubilizing agent. Therefore, in certain embodiments, once the fracturing treatment operation has been completed, a solubilizing agent is introduced into the well bore (or may be already present in the subterranean formation), whereby the particulate comprising a scale inhibitor or a chelating agent is dissolved. In some embodiments, the solubilizing agent may have the effect of causing the particulate comprising a scale inhibitor or a chelating agent to form its free acid, to dissolve, to hydrolyze into solution, to form its salt, to change salts, etc. and thereby become soluble. After a chosen time, the fracturing fluid may be recovered through the well bore that penetrates the subterranean formation.

Suitable solubilizing agents include salts, including ammonium salts, or aqueous fluids containing a salt or having a different pH than the fracturing fluid, such as brine, formation fluids (e.g., produced formation water, returned load water, etc.), acidic fluids, and spent acid. The type of solubilizing agent used generally depends upon the type of particulate to be solubilized. For example, solubilizing agents comprising acidic fluids may be suitable for use with polymeric scale inhibitors. One of ordinary skill in the art with the benefit of this disclosure will be able to select an appropriate solubilizing agent based on the type of scale inhibitor or chelating agent used.

In some embodiments, the fracturing fluid can optionally comprise an acid generating compound. Examples of acid generating compounds that may be suitable for use in the present invention include, but are not limited to, esters, aliphatic polyesters, ortho esters, which may also be known as ortho ethers, poly(ortho esters), which may also be known as poly(ortho ethers), poly(lactides), poly(glycolides), poly(ϵ-caprolactones), poly(hydroxybutyrates), poly(anhydrides), or copolymers thereof. Derivatives and combinations also may be suitable. The term "copolymer" as used herein is not limited to the combination of two polymers, but includes any combination of polymers, e.g., terpolymers. Other suitable acid-generating compounds include: esters including, but not limited to, ethylene glycol monoformate, ethylene glycol diformate, diethylene glycol diformate, glyceryl monoformate, glyceryl diformate, glyceryl triformate, triethylene glycol diformate and formate esters of pentaerythritol. Other suitable materials may be disclosed in U.S. Pat. Nos. 6,877,563 and 7,021,383, the disclosures of which are incorporated by reference.

In some embodiments, particulates comprising a scale inhibitor or a chelating agent suitable for use in the present invention may be at least partially coated or encapsulated with slowly water soluble or other similar encapsulating materials. Such materials are well known to those skilled in the art. Examples of water-soluble and other similar encapsulating materials that can be utilized include, but are not limited to, porous solid materials such as precipitated silica, elastomers, polyvinylidene chloride (PVDC), nylon, waxes, polyurethanes, cross-linked partially hydrolyzed acrylics, and the like.

Degradable anionic compounds that can bind a multi-valent metal advantage over other potential chemistries are their ability to provide a secondary function such as scale or iron control. This may also provide an economical advantage.

Solid Materials that Degrade by Sublimation

Suitable examples of degradable materials that can be used in accordance with the present invention include but are not limited to those that sublime under the design temperature or finally under the bottom hole static temperature ("BHST") of the treatment zone.

An example of a suitable solid is a solid azo organic compound having an azo component and a methylenic component and is characterized by having a melting point of at least 332.6° F., a degree of solubility in water at a temperature of from about 200° F. to about 425° F. and a pressure of 600 pounds per square inch (p.s.i.) of less than about 20 pounds of the compound in 1,000 gallons of water, a degree of solubility in kerosene at a temperature of from about 200° F. to about 425° F. and a pressure of 600 p.s.i. of at least 2 pounds of the compound in 1,000 gallons of kerosene, and a sublimation rate at a temperature of from about 250° F. to about 425° F. of from about 1 percent by weight of the compound in 24 hours to about 100 percent by weight of the compound in 12 hours.

Examples of suitable solid azo compounds having an azo component and a methylenic component such as the compounds known as Hansa Yellow G and Fast Yellow 4RLF. Hansa Yellow G can be made by coupling orthonitroparatoluidine and acetoacetanilide. Methods of its preparation are well known and are disclosed in U.S. Pat. No. 2,410,219. Fast Yellow 4RLF dye's preparation is well known and is disclosed in U.S. Pat. No. 2,410,219. Additional disclosure is provided in U.S. Pat. No. 4,527,628. U.S. Pat. Nos. 2,410,219 and 4,527,628 are incorporated by reference.

Solid materials that degrade by sublimation have a technical advantage in that no aqueous phase is needed for their degradation.

Degradable Dehydrated Compounds

Dehydrated compounds may be used in accordance with the present invention as a degradable material. As used herein, a dehydrated compound means a compound that is anhydrous or of a lower hydration state, but chemically reacts with water to form one or more hydrated states where the hydrated state is more soluble than the dehydrated or lower hydrated state.

A dehydrated compound is suitable for use in the present invention if it will degrade over time as it is hydrated. For example, a particulate solid anhydrous borate material that degrades over time can be suitable. Specific examples of particulate solid anhydrous borate materials that may be used include but are not limited to anhydrous sodium tetraborate (also known as anhydrous borax), and anhydrous boric acid. These anhydrous borate materials are only slightly soluble in water. However, with time and heat in a subterranean environment, the anhydrous borate materials react with the surrounding aqueous fluid and are hydrated. The resulting hydrated borate materials are substantially soluble in water as compared to anhydrous borate materials and as a result degrade in the aqueous fluid. In some instances, the total time required for the anhydrous borate materials to degrade in an aqueous fluid is in the range of from about 8 hours to about 72 hours depending upon the temperature of the treatment zone in which they are placed.

Examples of suitable boron compounds are disclosed in U.S. patent application Ser. No. 12/957,522, filed on Dec. 1, 2010, entitled "Methods of Providing Fluid Loss Control or Diversion," incorporated herein by reference. A relatively insoluble borate material ("RIBM") degrades or dissolves in the presence of an aqueous fluid in contact therewith and, once removed, the free movement of fluids within the formation is again allowed.

The RIBM's suitable for use in the present invention include, but are not limited to, solid, slowly soluble borate materials such as anhydrous sodium tetraborate (also known as anhydrous borax), sodium tetraborate monohydrate, and anhydrous boric acid (also known as boric oxide). Without being limited by theory, it is believed that these borate materials are only slightly soluble in water; however, with time and heat in the subterranean zone, the borate materials react with the surrounding aqueous fluid and are hydrated. The resulting hydrated borate materials are highly soluble in water as compared to the anhydrous borate materials and as a result can be dissolved in an aqueous fluid. The total time required for the anhydrous borate materials to degrade and dissolve in an aqueous fluid is in the range of from about eight hours to about seventy-two hours depending upon the temperature of the subterranean zone in which they are placed. One skilled in the art would recognize that some hydrates, such as sodium tetraborate monohydrate, are relatively insoluble compared to their counterparts that are hydrated to a greater degree.

The RIBM degrades over time when in contact with an aqueous fluid and converts to the hydrated form of borate material. The treatment fluid itself may be aqueous, or the RIBM may come into contact with water after it is placed into the subterranean formation. The RIBM dissolves in an aqueous fluid, thereby eliminating the need for contacting the subterranean zone with clean-up fluids to remove the material and restore permeability. Another advantage of the relatively insoluble borate material particulates used in the present invention is that the melting points of the materials are high, i.e., 1367° F. for anhydrous sodium tetraborate and 840° F. for anhydrous boric oxide, and as a result, the materials do not readily soften and are suitable for use in high temperature subterranean zones.

Selection of an RIBM and treatment fluid for a desired use depends on a number of factors including (1) the solubility of the chosen RIBM, (2) the particle size of the RIBM, (3) the pH of the treatment fluid, (4) the design temperature, and (5) the loading of RIBM in the treatment fluid.

The solubility of the RIBM can be affected by the pH of the treatment fluid, by the design temperature, and by the selection of the RIBM itself. By way of example, for pH levels of between about 8 and 12, higher pH increases solubility of an anhydrous boric acid RIBM to whereas decreasing the pH increases the solubility of an anhydrous borax RIBM. In preferred embodiments of the present invention, the solubility of the RIBM is controlled such that complete dissolution of the RIBM at design temperature takes more than two hours, and in some cases longer than a week. In still other preferred embodiments, the solubility of the RIBM is controlled such that 50% dissolution of the RIBM at design temperature takes at least two hours. In still other preferred embodiments, the solubility of the RIBM is controlled such that 50% dissolution of the RIBM at design temperature takes at least twenty-four hours.

To allow for relatively slow solubility, the treatment fluids of the present invention are preferably pH neutral or below, at least initially.

Degradable Liquid Particulate in Fracturing Fluid to Reduce Flow through a Proppant Pack According to another embodiment of the inventions, an insoluble liquid particulate that is degradable can be included in the fracturing fluid to help increase fracture complexity. The insoluble liquid particulate can be used to form an emulsion, whereby the apparent viscosity of the fracturing fluid is increased. This reduces the permeability of the proppant pack to the fracturing fluid, which can be used to help reduce the flow of fracturing fluid through the proppant pack, thereby increasing fracturing fluid. The methods of using an insoluble solid particulate can be particularly effective when combined with the method of using an insoluble liquid particulate.

Suitable degradable liquids include acid generating compounds. Examples of acid generating compounds that depending on molecular weight and other chemical properties can be in a liquid state include esters; ortho ethers (that may be referred to as ortho esters); poly(ortho ethers). Aliphatic polyesters; lactides, poly(lactides); glycolides; poly(glycolides); lactones; poly(.epsilon.-caprolactones); poly(hydroxybutyrates); anhydrides; poly(anhydrides); and poly(amino acids) may also be suitable if dissolved in an appropriate solvent that does not negatively impact the subterranean formation in which they be used (e.g., they do not create an additional clean up hindrance). Such compounds are described in U.S. Pat. No. 7,686,080, which is incorporated herein by reference.

Degradable dehydrated compounds have several advantageous properties. First, they have minimal impact on the pH. Second, some also swell and this may provide additional control of fluid flow. Finally, they typically degrade faster than degradable polymers.

Step of Allowing or Causing the Particulate to Degrade

After the step of introducing a fracturing fluid comprising the first solid particulate, the methods include a step of allowing or causing the first solid particulate to degrade. If a second particulate that is degradable is used, the methods preferably include a step of allowing or causing the second particulate to degrade. The first and second particulates can be the same or different, and can degrade at the same or different rates. As discussed above, this preferably occurs with time under the conditions in the zone of the subterranean fluid. It is contemplated, however, that a clean-up treatment could be introduced into the zone to help degrade the degradable material of the first solid particulate.

Additional Step of Monitoring

Any of the methods according to the invention preferably further include a step of monitoring the wellhead pressure to help determine the actual end of the fracturing stage. The end of the fracturing stage is the end of pumping into the treatment zone, which can be due to screenout at or near the wellbore or other mechanical or chemical diversion of fluid to a different treatment zone.

According to another embodiment, the methods more preferably further include a step of monitoring the pressure in the wellbore along the treatment zone.

According to a presently most-preferred embodiment, the methods most preferably further include a step of determining microseismic activity near the zone to confirm an increase in fracture complexity in the treatment zone.

Seismic data is used in many scientific fields to monitor underground events in subterranean rock formations. In order to investigate these underground events, micro-earthquakes, also known as microseisms, are detected and monitored. Like earthquakes, microseisms emit elastic waves—compressional ("p-waves") and shear ("s-waves"), but they occur at much higher frequencies than those of earthquakes and generally fall within the acoustic frequency range of 200 Hz to more than 2000 Hz. Standard microseismic analysis techniques locate the sources of the microseismic activity caused by fluid injection or hydraulic fracturing Microseismic detection is often utilized in conjunction with hydraulic fracturing or water flooding techniques to map created fractures. A hydraulic fracture induces an increase in the formation stress proportional to the net fracturing pressure as well as an increase in pore pressure due to fracturing fluid leak off. Large tensile stresses are formed ahead of the crack tip, which creates large amounts of shear stress. Both mechanisms, pore pressure increase and formation stress increase, affect the stability of planes of weakness (such as natural fractures and bedding planes) surrounding the hydraulic fracture and cause them to undergo shear slippage. It is these shear slippages that are analogous to small earthquakes along faults.

Microseisms are detected with multiple receivers (transducers) deployed on a wireline array in one or more offset well bores. With the receivers deployed in several wells, the microseism locations can be triangulated as is done in earthquake detection. Triangulation is accomplished by determining the arrival times of the various p- and s-waves, and using formation velocities to find the best-fit location of the microseisms. However, multiple offset wells are not usually available. With only a single nearby offset observation well, a multi-level vertical array of receivers is used to locate the microseisms. Data is then transferred to the surface for subsequent processing to yield a map of the hydraulic fracture network geometry.

Additional Step of Repeating Method in Another Treatment Zone

The methods according to the invention have application in multi-stage fracturing of a subterranean formation having ultra-low permeability. Preferably, a method according to the invention further includes repeating the steps for another treatment zone of the subterranean formation: (a) designing a fracturing stage for a treatment zone of the subterranean formation; and (b) performing the fracturing stage as designed.

Additional Step of Producing Hydrocarbon from Subterranean Formation

Preferably, the methods according to the invention further include the step of producing hydrocarbon from the subterranean formation.

CONCLUSIONS

Therefore, the present invention is well adapted to attain the ends and advantages mentioned as well as those that are inherent therein. The particular embodiments disclosed above are illustrative only, as the present invention may be modified and practiced in different but equivalent manners apparent to those skilled in the art having the benefit of the teachings herein. Furthermore, no limitations are intended to the details of construction or design herein shown, other than as described in the claims below. It is, therefore, evident that the particular illustrative embodiments disclosed above may be altered or modified and all such variations are considered within the scope and spirit of the present invention. While compositions and methods are described in terms of "comprising," "containing," or "including" various components or steps, the compositions and methods also can "consist essentially of" or "consist of" the various components and steps. Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a to b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an", as used in the claims, are defined herein to mean one or more than one of the element that it introduces. If there is any conflict in the usages of a word or term in this specification and one or more patent(s) or other documents that may be incorporated herein by reference, the definitions that are consistent with this specification should be adopted.

What is claimed is:

1. A method of increasing the fracture complexity in a treatment zone of a subterranean formation, wherein the subterranean formation is characterized by having a matrix permeability less than 1.0 microDarcy, the method comprising:
   pumping a treatment fluid including a proppant into a far-field region of a treatment zone of the subterranean formation;
   subsequently pumping one or more fracturing fluids into the far-field region of the treatment zone of the subterranean formation at a rate and pressure above the fracture pressure of the treatment zone,
   wherein a first fracturing fluid of the one or more fracturing fluids comprises a first solid particulate and does not comprise a proppant, and wherein:
   (a) the first solid particulate comprises a first particle size range effective for bridging the pore throats of a proppant pack previously formed or to be formed in the far-field region of the treatment zone, wherein the first particle size range has an upper end that is less than or equal to ⅙th of the median size of the proppant;
   (b) the first solid particulate is in an insufficient amount in the first fracturing fluid to increase the packed volume fraction of any region of the proppant pack to greater than 73%; and
   (c) the first solid particulate comprises a degradable material that is an anionic compound that can bind with a multi-valent metal, wherein the degradable material comprises a water-insoluble chelating agent.

2. The method according to claim 1, wherein the degradable material of the first solid particulate comprises a chemical selected from the group consisting of the acidic forms of the following: ethylenediaminetetraacetic acid (EDTA), hydroxyethyl ethylenediamine triacetic acid (HEDTA), nitrilotriacetic acid (NTA), diethylene triamine pentaacetic acid (DTPA), glutamic acid diacetic acid (GLDA), glucoheptonic acid (CSA), propylene diamine tetraacetic acid (PDTA), ethylenediaminedisuccinic acid (EDDS), diethanolglycine (DEG), ethanoldiglycine (EDG), glucoheptonate, citric acid, malic acid, phosphates, amines, citrates, polyphosphates, aminocarboxylic acids, aminopolycarboxylates, 1,3-diketones, hydroxycarboxylic acids, polyamines, aminoalcohols, aromatic heterocyclic bases, phenols, aminophenols, oximes, Schiff bases, tetrapyrroles, sulfur compounds, synthetic macrocyclic compounds, polyethoeneimines, polymethacryloylacetone, poly(p-vinylbenzyliminodiacetic acid, phosphonic acids, derivatives thereof, and combinations thereof.

3. The method according to claim 1, wherein the first fracturing fluid comprises a solubilizing agent selected from the group consisting of: a salt or an acid.

4. The method according to claim 1, wherein the first fracturing fluid comprises an acid generating compound.

5. The method according to claim 1, wherein the first solid particulate is in at least a sufficient amount in the first fracturing fluid to reduce the permeability of at least a region of the proppant pack at least 50%.

6. The method according to claim 1, wherein the first fracturing fluid has a viscosity in the range of about 0.7 cP to about 10 cP.

7. The method according to claim 1, wherein the first fracturing fluid is the only fracturing fluid used in the fracturing stage.

8. The method according to claim 1, wherein the proppant of the proppant pack has a graded particle size range anywhere between −70/+140 U.S. Standard Mesh.

9. The method according to claim 1, wherein the proppant pack is previously formed in the treatment zone before the fracturing stage.

10. The method according to claim 1, wherein the proppant pack is to be formed in the treatment zone during the fracturing stage.

11. The method according to claim 1, wherein the first particle size range has a lower end that is greater than or equal to about ⅓th of the median particle size of the proppant.

12. The method according to claim 1, wherein the first solid particulate comprises a second particle size range effective for bridging the pore throats of the first solid particulate.

13. The method according to claim 1, wherein the first fracturing fluid comprises a second solid particulate, wherein the second solid particulate has a second particle size range effective for bridging the pore throats of the first solid particulate.

14. The method according to claim 13, wherein the second solid particulate is degradable.

15. The method according to claim 1, further comprising the step of: after pumping the one or more fracturing fluids into the treatment zone, allowing or causing the first solid particulate to degrade.

16. The method according to claim 1, further comprising: determining microseismic activity to confirm an increase in fracture complexity in the treatment zone.

17. The method according to claim 1, further comprising repeating the step of pumping one or more fracturing fluids in a second treatment zone of the subterranean formation.

18. The method according to claim 1, wherein the proppant of the proppant pack is equal to or less than 100 U.S. Standard Mesh.

19. The method according to claim 1, wherein the treatment fluid does not comprise a first solid particulate.

20. A method of increasing the fracture complexity in a treatment zone of a subterranean formation, wherein the subterranean formation is characterized by having a matrix permeability less than 1.0 microDarcy, the method comprising:
  pumping two or more fracturing fluids into the treatment zone at a rate and pressure above the fracture pressure of the treatment zone for a total pumping volume greater than 2 wellbore volumes, wherein:
   (a) a first fracturing fluid of the two or more fracturing fluids is pumped into the treatment zone at least before the last 2 wellbore volumes of the total pumping volume, wherein the first fracturing fluid comprises a proppant, wherein the first fracturing fluid does not include a first solid particulate; and
   (b) a second fracturing fluid of the two or more fracturing fluids is pumped into the treatment zone after the first fracturing fluid is pumped into the treatment zone but at least before the last 2 wellbore volumes of the total pumping volume, wherein the second fracturing fluid comprises the first solid particulate;
  wherein the first solid particulate comprises a first particle size range effective for bridging the pore throats of a proppant pack formed in the treatment zone by the proppant of the first fracturing fluid; and
  wherein the first solid particulate comprises a degradable material that is an anionic compounds that can bind with a multi-valent metal, wherein the degradable material comprises a water-insoluble chelating agent.

21. The method according to claim 20, wherein the second fracturing fluid comprises the proppant.

22. The method according to claim 20, wherein the first particle size range has an upper end that is less than or equal to ⅙th of the median size of the proppant.

23. The method according to claim 22, wherein the first particle size range has a lower end that is greater than or equal to about ¹/₁₃th of the median particle size of the proppant.

24. The method according to claim 22, wherein the first solid particulate is in at least a sufficient amount in the first fracturing fluid to reduce the permeability of at least a region of the proppant pack at least 50%.

25. The method according to claim 24, wherein the proppant of the proppant pack is equal to or less than 100 U.S. Standard Mesh.

26. The method according to claim 20, wherein the degradable material of the first solid particulate comprises a chemical selected from the group consisting of the acidic forms of the following: ethylenediaminetetraacetic acid (EDTA), hydroxyethyl ethylenediamine triacetic acid (HEDTA), nitrilotriacetic acid (NTA), diethylene triamine pentaacetic acid (DTPA), glutamic acid diacetic acid (GLDA), glucoheptonic acid (CSA), propylene diamine tetraacetic acid (PDTA), ethylenediaminedisuccinic acid (EDDS), diethanolglycine (DEG), ethanoldiglycine (EDG), glucoheptonate, citric acid, malic acid, phosphates, amines, citrates, polyphosphates, aminocarboxylic acids, aminopolycarboxylates, 1,3-diketones, hydroxycarboxylic acids, polyamines, aminoalcohols, aromatic heterocyclic bases, phenols, aminophenols, oximes, Schiff bases, tetrapyrroles, sulfur compounds, synthetic macrocyclic compounds, polyethoeneimines, polymethacryloylacetone, poly(p-vinylbenzyliminodiacetic acid, phosphonic acids, derivatives thereof, and combinations thereof.

27. A method of increasing the fracture complexity in a treatment zone of a subterranean formation, wherein the subterranean formation is characterized by having a matrix permeability less than 1.0 microDarcy, the method comprising:
  pumping a treatment fluid including a proppant into a far-field region of the treatment zone of the subterranean formation, wherein the treatment fluid does not comprise a first solid particulate;
  pumping one or more fracturing fluids into the far-field region of the treatment zone of the subterranean formation at a rate and pressure above the fracture pressure of the treatment zone,
   wherein a first fracturing fluid of the one or more fracturing fluids comprises a first solid particulate, and wherein:
   (a) the first solid particulate comprises a first particle size range effective for bridging the pore throats of a proppant pack previously formed in the far-field region of the treatment zone; and
   (b) the first solid particulate comprises a degradable material that is an anionic compounds that can bind with a multi-valent metal, wherein the degradable material comprises a water-insoluble chelating agent.

28. The method according to claim 27, wherein the first particle size range has an upper end that is less than or equal to ⅙th of the median size of the proppant.

29. The method according to claim 28, wherein the first particle size range has a lower end that is greater than or equal to about ¹/₁₃th of the median particle size of the proppant.

30. The method according to claim 28, wherein the first solid particulate is in at least a sufficient amount in the first fracturing fluid to reduce the permeability of at least a region of the proppant pack at least 50%.

31. The method according to claim 30, wherein the proppant of the proppant pack is equal to or less than 100 U.S. Standard Mesh.

32. The method according to claim 27, wherein the degradable material of the first solid particulate comprises a chemical selected from the group consisting of the acidic forms of the following: ethylenediaminetetraacetic acid (EDTA), hydroxyethyl ethylenediamine triacetic acid (HEDTA), nitrilotriacetic acid (NTA), diethylene triamine pentaacetic acid (DTPA), glutamic acid diacetic acid (GLDA), glucoheptonic acid (CSA), propylene diamine tetraacetic acid (PDTA), ethylenediaminedisuccinic acid (EDDS), diethanolglycine (DEG), ethanoldiglycine (EDG), glucoheptonate, citric acid, malic acid, phosphates, amines, citrates, polyphosphates, aminocarboxylic acids, aminopolycarboxylates, 1,3-diketones, hydroxycarboxylic acids, polyamines, aminoalcohols, aromatic heterocyclic bases, phenols, aminophenols, oximes, Schiff bases, tetrapyrroles, sulfur compounds, synthetic macrocyclic compounds, polyethoeneimines, polymethacryloylacetone, poly(p-vinylbenzyliminodiacetic acid, phosphonic acids, derivatives thereof, and combinations thereof.

* * * * *